United States Patent [19]

Shimizu et al.

[11] Patent Number: 5,908,700
[45] Date of Patent: Jun. 1, 1999

[54] HYDROXYL GROUPS-TERMINATED MACROMONOMER GRAFTED ON POLYURETHANE

[75] Inventors: Yoshinori Shimizu; Gaddam N. Babu, both of Woodbury; Albert I. Everaerts, Oakdale, all of Minn.

[73] Assignee: Minnesota Mining & Manufacturing Company, St. Paul, Minn.

[21] Appl. No.: 08/871,158

[22] Filed: Jun. 9, 1997

Related U.S. Application Data

[63] Continuation of application No. 08/725,272, Oct. 2, 1996, abandoned, which is a continuation of application No. 08/438,637, May 10, 1995, abandoned.

[51] Int. Cl.$^6$ .......................... B32B 27/04; B32B 25/08; C08F 20/10; C08G 18/67

[52] U.S. Cl. .................................... 428/423.1; 428/424.7; 428/425.1; 428/425.6; 428/425.8; 525/131; 526/303.1; 526/307.7; 526/328; 526/329.5

[58] Field of Search .............................. 428/423.1, 424.7, 428/525, 425.1, 425.6, 425.8; 525/131; 526/322, 327, 329.5, 303.1, 307.7, 328

[56] References Cited

U.S. PATENT DOCUMENTS

| | | | |
|---|---|---|---|
| 3,862,267 | 1/1975 | Milkovich et al. | 260/878 R |
| 4,068,050 | 1/1978 | Danzig et al. | 526/21 |
| 4,110,412 | 8/1978 | Danzig et al. | 260/873 |
| 4,775,719 | 10/1988 | Markevka et al. | 525/130 |
| 4,818,804 | 4/1989 | Kuriyama et al. | 526/211 |
| 4,889,915 | 12/1989 | Brauer et al. | 525/458 |
| 4,985,535 | 1/1991 | Takada et al. | 528/272 |
| 5,015,321 | 5/1991 | Jansen et al. | 156/331.7 |
| 5,019,638 | 5/1991 | Muller et al. | 528/83 |
| 5,021,507 | 6/1991 | Stanley et al. | 525/127 |
| 5,034,453 | 7/1991 | Takada et al. | 524/590 |
| 5,036,143 | 7/1991 | Brauer et al. | 524/361 |
| 5,058,607 | 10/1991 | Carter et al. | 131/58 |
| 5,061,761 | 10/1991 | Sato et al. | 525/329.8 |
| 5,115,073 | 5/1992 | Meckel et al. | 528/83 |
| 5,155,180 | 10/1992 | Takada et al. | 525/440 |
| 5,156,911 | 10/1992 | Stewart | 428/355 |
| 5,173,538 | 12/1992 | Gilch et al. | 525/130 |
| 5,225,470 | 7/1993 | Mancinelli | 525/210 |
| 5,266,606 | 11/1993 | Gilch et al. | 521/159 |
| 5,367,036 | 11/1994 | Saito | 525/440 |
| 5,418,288 | 5/1995 | Kawasaki et al. | 525/79 |
| 5,472,785 | 12/1995 | Stobbie, IV et al. | 525/130 |

FOREIGN PATENT DOCUMENTS

| | | |
|---|---|---|
| 4178417 | 6/1992 | Japan . |
| 04272917-A | 9/1992 | Japan . |
| 5-230166 | 9/1993 | Japan . |
| 06128550-A | 5/1994 | Japan . |
| 6-158014-A | 6/1994 | Japan . |
| 6-158017-A | 6/1994 | Japan . |
| 92/07015 | 4/1992 | WIPO . |
| 92/11335 | 7/1992 | WIPO . |
| 92/14768 | 9/1992 | WIPO . |

OTHER PUBLICATIONS

"Synthesis of Polyurethane Graft Copolymers by Polyaddition Reaction of Dihydroxyl–Terminated Macromonomers", Polymer Bulletin 8, 239–244 (1982).

"Synthesis of Polyamide–Poly(methyl methacrylate) Graft Copolymers by Polycondensation Reactions of Macromonomers", Polymer Bulletin 5, 361–366 (1981).

Primary Examiner—Robert E. Sellers

[57] ABSTRACT

A moisture-curable, hot melt composition comprising a graft polyurethane prepolymer made by reacting a macromonomer, polyol, polyisocyanate and optional silane reagent is provided. The composition advantageously provides adhesives having initial creep resistance, short set times, and long open times.

29 Claims, No Drawings

HYDROXYL GROUPS-TERMINATED MACROMONOMER GRAFTED ON POLYURETHANE

This is a continuation of application Ser. No. 08/725,272, filed Oct. 2, 1996, which is a continuation of application Ser. No. 08/438,637, filed May 10, 1995, both now abandoned.

FIELD OF THE INVENTION

The present invention relates generally to a moisture-curable, hot melt composition. More specifically, the composition comprises a graft polyurethane prepolymer. Advantageously, the composition provides an adhesive having a short set time, long open time, and initial creep resistance.

BACKGROUND OF THE INVENTION

Polyurethane prepolymers may be used to provide hot melt adhesives that cure upon exposure to moisture. Such adhesives are solid at room temperature but melt to a viscous liquid when heated to moderate temperatures (for example, less than 135° C.). The adhesive is applied in a molten state to a substrate, and the substrate is mated to a second surface. As the adhesive cools, it rapidly "sets up" (i.e., solidifies and/or crystallizes), thereby forming a bond between the substrate and the second surface. "Set time" defines the time required for the moisture-curable, hot melt adhesive to crystallize or solidify and form a bond between the substrate and second surface once they have been mated.

Another related property which can be used to describe a moisture-curable, hot melt adhesive is "creep resistance". "Creep resistance" refers to the capacity of a bond to sustain a constant load applied under a constant stress. A bond which creeps moves slowly under stress. Items bonded together by an adhesive which tends to creep will move, may not stay in place, and may even fail. A bond which is creep resistant combats this tendency. Preferably, the bond is creep resistant within minutes of bond formation. In this case, the bond may be described as providing "initial" creep resistance.

"Open time" is another property which can be used to characterize a moisture-curable, hot melt adhesive and refers to the amount of time available to form bonds once the adhesive is applied to a substrate. Once the open time has been exceeded, the substrate and a second surface typically cannot be successfully mated.

Typical uses for moisture-curable, hot-melt adhesives include the construction of signs, advertising displays, and various laminates such as table tops, sound absorption panels, countertops, wall partitions, and the like. For these applications, it is desirable to use a moisture-curable, hot melt adhesive that provides a short set time, initial creep resistance, and a long open time. An adhesive that provides a short set time and initial creep resistance obviates the need to clamp the bonded materials together and/or store the parts for an extended period of time to allow the adhesive to build strength subsequent to further processing. Either of these requires additional processing which causes delays in building the finished product. In addition, initial creep resistance enables the bonded items to stay in place despite the application of a constant stress shortly after the parts are mated. This is especially important, for example, in applications where parts are attached to substrates such as door panels which are in a vertical position. In this case, unless the adhesive provides initial creep resistance, the force of gravity may cause the part to substantially shift downward.

Other examples of applications where initial creep resistance is important include those where sheets or materials are bonded to curved surfaces or to articles which exert "memory forces". "Memory forces" may be exerted, for example, by a roll of material that has been tightly wound and subsequently unwound, the material having a tendency to curl due to its "memory" of being in a roll. Such forces can cause the two mated materials to shift, unless the adhesive provides initial creep resistance. A long open time allows the moisture-curable, hot melt adhesive to be coated onto a large surface and subsequently attached to a second surface before the adhesive loses its ability to form bonds. In addition, a long open time also allows the moisture-curable, hot melt adhesive to be spray coated. In general, spray coating exposes a larger surface area of adhesive to cooling; and if the adhesive does not possess a sufficiently long open time, it may prematurely lose its ability to form bonds.

Numerous references describe ways to improve the properties of moisture-curable, hot melt adhesives comprising polyurethane prepolymers. For example, U.S. Pat. No. 5,021,507 (Stanley et al.) describes the addition of urethane prepolymers to low molecular weight polymers formed from ethylenically unsaturated monomers which do not contain active hydrogen. The reference states that such a composition provides hot melt adhesives and gasketing compositions which have improved initial cohesive strength as well as improved strength after aging.

U.S. Pat. No. 5,173,538 (Gilch et al.) describes a hot melt polyurethane composition comprising a mixture of at least two polyurethane prepolymers, the first polyurethane prepolymer having a glass transition temperature above room temperature and a second polymer or polyurethane prepolymer having a glass transition temperature below room temperature. The reference states that the composition provides a fast-setting adhesive that cures with atmospheric moisture to give flexible bonding over a wide temperature range.

U.S. Pat. No. 5,115,073 (Meckel et al.) describes a polyurethane system containing isocyanate groups prepared by reacting at least one polyester diol having a melting point of 30 to 60° C. and a molecular weight of 800 to 8,000; a polyester diol having a melting point of 65 to 150° C. and a molecular weight between 600 and 8,000; a diol having a molecular weight less than 600; and a polyisocyanate. The reference states that the crystallization rate of such systems is greatly accelerated.

Other references which describe ways to improve the properties of moisture-curable, hot melt adhesives comprising polyurethane prepolymers include, for example, JP 3-88886; U.S. Pat. No. 4,889,915; U.S. Pat. No. 5,036,143; U.S. Pat. No. 5,266,606; U.S. Pat. No. 5,034,453; U.S. Pat. No. 4,985,535; U.S. Pat. No. 5,019,638; U.S. Pat. No. 5,155,180; WO 9207015; JP 6-158017; and JP 6-158014. While many of these references describe ways to improve at least one of the properties of initial creep resistance, set time, and open time, or related properties thereof, a need exists for a moisture-curable, hot melt adhesive that provides an acceptable balance of all three properties.

SUMMARY OF THE INVENTION

The present invention relates to a moisture-curable, hot melt composition comprising a graft polyurethane prepolymer. "Moisture-curable" means that the composition cures upon exposure to moisture, for example, atmospheric moisture. "Hot melt" means that the composition is solvent-free, and solid at room temperature, but melts to a viscous liquid when heated to moderate temperatures (typically less than 135° C.). A hot melt composition is typically applied in a molten state to a first substrate which then may be mated to a second surface. Upon cooling, an adhesive bond is formed between the two mated surfaces.

The graft polyurethane prepolymer comprises a polyurethane backbone having at least one macromonomer sidechain covalently bonded or grafted thereto. The term "macromonomer" means an oligomer bearing a terminal moiety having two hydroxyl groups that can copolymerize with monomers to form graft copolymers with pendent, preformed polymer chains. The term "prepolymer" means that the polyurethane backbone is terminated by at least one moisture-reactive group (such as an isocyanate group (NCO) or a silane group ($SiY_3$)).

Preferably, the graft polyurethane prepolymer comprises NCO termination and is made by reacting one or more macromonomer(s) bearing a terminal moiety having two hydroxyl groups, one or more polyol(s), and an excess of one or more polyisocyanate(s). Preferably, the equivalent ratio of isocyanate to hydroxyl used in the reaction is at least 1.2/1. Preferably, either the polyol or the macromonomer is crystalline. For example, when the macromonomer is amorphous, then the polyol is preferably crystalline. Conversely, when the polyol is amorphous, then the macromonomer is preferably crystalline. More preferably, the macromonomer is crystalline, and a mixture of crystalline and amorphous polyols is used. For purposes of the present invention, the term "crystalline" means that the material has sufficient crystallinity such that it exhibits a measurable melting temperature ($T_m$), although such a material is not required to be 100% crystalline. A material that does not exhibit a $T_m$ is herein defined as being "amorphous", although such a material is not required to be 100% amorphous.

When the graft polyurethane prepolymer comprises silane group termination, it may be made by reacting the NCO-terminated graft polyurethane prepolymer described above with one or more silane reagents that are reactive with NCO. It may also be made using a one step method by reacting one or more dihydroxy functional macromonomer(s), one or more polyols, one or more polyisocyanate(s), and one or more isocyanate-terminated silane(s).

The dihydroxy functional macromonomer bears a terminal moiety having two hydroxyl groups and comprises polymerized units of one or more monomers that are free from active hydrogen-containing moieties. More specifically, it may be described by the following structure:

<p style="text-align:center">A—X—B          Structure 1</p> wherein A is hydrogen or a fragment of an initiator; B is hydrogen, a fragment of a chain transfer agent, or a moiety derived from a capping agent that has been reacted to yield terminal dihydroxy groups, with the proviso that A and B are not the same and only one of A and B bears a terminal moiety having two hydroxyl groups; and X comprises polymerized units of one or more monomers that are free from active hydrogen-containing moieties. The term "fragment" means the portion of the initiator or chain transfer agent that remains permanently attached to the polymer chain after polymerization. The hydroxy moieties of either A or B enable the formation of macromonomer sidechains on a polymer backbone.

Preferably, the macromonomer has sufficient crystallinity such that it exhibits a melting temperature ($T_m$). In this case, X preferably comprises polymerized units of at least one monomer that has sufficient crystallinity such that it exhibits a $T_m$ (i.e., "crystalline monomer"); at least one monomer that provides a homopolymer having a $T_g$ greater than or equal to 5° C. (i.e., "high $T_g$ monomer"); and optionally at least one monomer that provides a homopolymer having a glass transition temperature ($T_g$) less than 5° C. (i.e., "low $T_g$ monomer"). $T_g$ values for homopolymers of various monomers can be found in the *Polymer Handbook*, 2nd ed. J. Brandrup, E. H. Immergut (John Wiley & Sons, 1975).

The composition of the invention may be used to provide a moisture-curable, hot melt adhesive that surprisingly has an acceptable balance of initial creep resistance, set time and open time. The test procedures for determining these properties may be found in the Example section. Briefly, initial creep resistance is measured by mating two substrates with adhesive in an overlapping configuration, applying a 0.45 kg (1 lb) weight to the mated substrates one minute after mating, and measuring the amount of substrate slippage (or creep) that occurs during a 30 minute period. Preferably, the substrates show no more than 1 mm creep. Set time is measured as the time necessary for a bond to set in order to hold a 2.25 kg (5 lb) weight applied for 120 seconds in the tensile mode. Preferably, the set time is less than 60 seconds. Open time is measured as the maximum amount of time during which a cardboard-tearing bond can be formed. Preferably, the open time is greater than 5 minutes.

While moisture-curable, hot melt adhesives are of primary interest, the composition of the invention may also be used to provide sealants, protective coatings, vibration damping materials, and the like.

DETAILED DESCRIPTION OF THE INVENTION

The graft polyurethane prepolymer comprises a polyurethane backbone having sidechains covalently bonded thereto. The sidechains are derived from the dihydroxy functional macromonomer. More specifically, the terminal moiety having two hydroxyl groups of the macromonomer becomes incorporated into the polyurethane backbone, while the remaining X-containing moiety of the macromonomer forms sidechains pendent from the backbone.

The polyurethane backbone is terminated by at least one moisture-reactive group. Preferably, the backbone comprises two terminal moisture-reactive groups. The moisture-reactive groups may be either NCO or $SiY_3$. Preferably, the graft polyurethane prepolymer has NCO termination and is made by reacting macromonomer(s), polyol(s), and an excess of polyisocyanate(s). For example, when B (or A) of the macromonomer comprises a terminal moiety having two hydroxyl groups, the reaction may be schematically illustrated as follows:

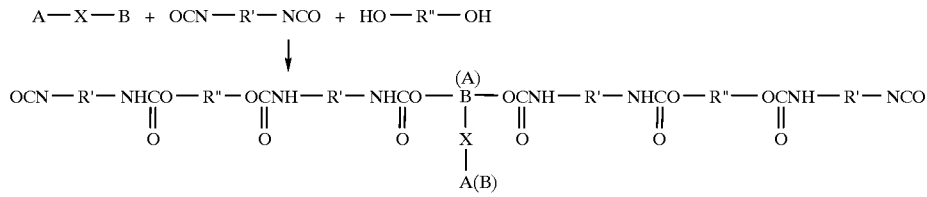

When silane termination is desired, the resulting isocyanate-terminated prepolymer may be further reacted with a silane reagent having isocyanate-reactive groups. It is also possible to prepare silane-terminated prepolymers using a one step method where one or more isocyanate-terminated silane reagents is used, for example, in the above reaction.

We turn now to a discussion of the macromonomer, polyol, polyisocyanate, and optional silane reagent used to make the graft polyurethane prepolymer.

Macromonomer

As indicated hereinabove, the macromonomer may be described by the following formula:

A—X—B                                                       Structure 1 wherein A is hydrogen or a fragment of an initiator; B is hydrogen, a fragment of a chain transfer agent, or a moiety derived from a capping agent that has been reacted to yield terminal dihydroxyl groups, with the proviso that A and B are not the same and only one of A and B bears a terminal moiety having two hydroxyl groups; and X comprises polymerized units of at least one monomer that is free from active hydrogen-containing moieties. It is important that the monomer units of X be free from active hydrogen-containing moieties (such as unsubstituted amine groups, carboxyl groups, thiol groups, hydroxyl groups, etc.) which may react with the polyisocyanate, causing, for example, formation of a gel.

The macromonomer may comprise polymerized units of a wide variety of monomers and may be crystalline or amorphous. When the macromonomer is amorphous, then it is preferred that the polyol be crystalline. Conversely, when the polyol is amorphous, then the macromonomer is preferably crystalline. It is also preferred that the polymerized units of the macromonomer consist essentially of (meth) acrylate monomers.

Preferably, the macromonomer is crystalline. It has been found that compositions made using crystalline macromonomers provide improved impact resistance, improved tack, and more rapid strength build-up compared to compositions made using amorphous macromonomers. This is demonstrated by the data in Table 14. In addition, it is also preferred to use a mixture of amorphous and crystalline polyols with the crystalline macromonomer to allow greater flexibility in tailoring the final properties of the graft polyurethane prepolymer.

A. Crystalline Macromonomer

When the macromonomer is crystalline, the monomer(s) of X in Structure 1 is/are preferably selected so that the macromonomer has a theoretical hydroxyl number (OH#) in the range of from 0.1 to 30, more preferably from 0.3 to 25, most preferably from 1 to 20. The OH# is inversely proportional to the number average molecular weight and the viscosity of the macromonomer.

As the OH# for a crystalline macromonomer falls below 0.1, the reactivity of the macromonomer diminishes making it less suitable for subsequent chemical grafting. At the same time, the molecular weight of the macromonomer increases making it less suitable for hot melt processing. As the OH# increases above 30, the number average molecular weight ($M_n$) of the macromonomer decreases and the effect of the macromonomer-derived sidechains on the properties of the prepolymer diminishes. This may cause, for example, a decrease in the initial creep resistance of the adhesive.

The OH# for a given macromonomer is defined as the milliequivalents of KOH (which has an equivalent weight of 56.11) in 1 gram of macromonomer. For purposes of the present invention, a theoretical OH# was calculated as follows:

$$OH\# = 56110 \times W_a / (W_b \times W_c)$$

wherein:
$W_a$ is the weight of the component containing hydroxyl groups used to make the macromonomer;
$W_b$ is the hydroxyl equivalent weight of the component containing hydroxyl groups used to make the macromonomer; and
$W_c$ is the total weight of the components used to make the macromonomer.

Sample Calculation:
For example, when the macromonomer is made using 50 grams octadecyl acrylate, 25 grams isooctyl acrylate, 25 grams N,N-dimethylacrylamide, 1 gram 3-mercapto-1,2-propanediol, and 0.1 gram thermal initiator, the OH# may be calculated as follows:

$W_a = 1$
$W_b$ = hydroxyl equivalent weight of 3-mercapto-1,2-propanediol, calculated as the molecular weight of this material (108) divided by two, and
$W_c = 50 + 25 + 25 + 1 + 0.1 = 101.1$ Thus, theoretical $OH\# = 56110 \times 1/(54 \times 101.1) = 10.28$ When the macromonomer is crystalline, it is also preferred that the monomer(s) of X in Structure 1 is/are selected so that the macromonomer has a $T_m$ in the range of from 15° C. to the hot melt application temperature (which is typically less than about 135° C.), more preferably from 20° C. to 80° C., most preferably from 25° C. to 65° C. As the $T_m$ for a crystalline macromonomer falls below 15° C., an insufficient amount of sidechains may recrystallize or solidify once the adhesive cools to room temperature, possibly resulting in, for example, longer set times. As the $T_m$ increases beyond the melt application temperature, the prepolymer comprising this macromonomer becomes difficult to melt process. $T_m$ is determined by measuring changes in specific volume and heat capacity through differential scanning calorimetry (DSC) as described in the Example section.

As noted previously, "X" of Structure 1 may comprise polymerized units of one or more monomers. When a single monomer is used to make "X" of the crystalline macromonomer, then the monomer is preferably a crystalline monomer that provides a macromonomer having an OH# and $T_m$ within the preferred ranges given above. Examples of crystalline monomers suitable for the present invention include monofunctional (meth)acrylate esters of non-tertiary alcohols, the alkyl portions of which comprise about 16 to about 50 carbon atoms (more preferably from about 18 to about 26 carbon atoms). As used herein, the term "(meth)acrylate" means methacrylate or acrylate. Examples of crystalline monomers include hexadecyl (meth)acrylate, octadecyl (meth)acrylate, eicosanyl (meth)acrylate, behenyl (meth)acrylate, and hexacosanyl (meth)acrylate. Hexadecyl (meth)acrylates and octadecyl (meth)acrylates are commercially available from Monomer-Polymer & Dajac Laboratories, Inc. (Feaseterville, Pa.) and Polysciences, Inc (Warrington, Pa.). (Meth)acrylate esters of non-tertiary alcohols, the alkyl portions of which comprise from about 30 to about 50 carbon atoms, are commercially available under tradename UNILIN from Petrolite Corporation (Tulsa, Okla.). Most preferably, when X comprises polymerized units of one monomer, the monomer is octadecyl acrylate.

When "X" of the crystalline macromonomer comprises polymerized units of two or more monomers (at least one of which is crystalline), the monomers may be selected from a wide variety of materials. Preferably, the monomers are again selected to provide a macromonomer that has an OH# and $T_m$ within the preferred ranges given above. It is also possible to select monomers comprising curable groups (referred to as "functional monomers") which can increase the crosslinking density of the ultimate adhesive. Examples of functional monomers include glycidyl (meth)acrylate and β-methacryloxy propyl trimethoxysilane.

Preferably, X comprises polymerized units of a crystalline monomer, a monomer that provides a homopolymer having a $T_g$ greater than or equal to 5° C. (hereinafter referred to as a "high $T_g$ monomer"), and optionally a monomer that provides a homopolymer having a $T_g$ less than 5° C. (hereinafter referred to as a "low $T_g$ monomer"). More preferably, X comprises a crystalline monomer, a high $T_g$ monomer, and a low $T_g$ monomer. Examples of crystalline monomers include those provided above. Blends of crystalline monomers may be used. Preferably, the crystalline monomer is octadecyl (meth)acrylate or behenyl (meth)acrylate. Of these, octadecyl acrylate is preferred.

The low $T_g$ and high $T_g$ monomers are different from each other on the basis of $T_g$. Preferably, the low $T_g$ monomer is selected from the broad class of monofunctional (meth) acrylate esters of non-tertiary alkyl alcohols (the alkyl portions of which comprise 1 to about 15 carbon atoms) which provide a homopolymer having a $T_g$ less than 5° C. Examples of useful low $T_g$ monomers include ethyl acrylate, butyl acrylate, 2-ethylhexyl (meth)acrylate, isooctyl (meth) acrylate, and lauryl (meth)acrylate. Other useful low $T_g$ monomers include vinyl esters such as vinyl 2-ethylhexanoate, and vinyl neododecanoate. Blends of low $T_g$ monomers may be used. Most preferably, the low $T_g$ monomer is butyl acrylate, isooctyl acrylate, lauryl acrylate, or 2-ethylhexyl acrylate.

Preferably, the high $T_g$ monomer is selected from the broad class of monofunctional (meth)acrylate esters of non-tertiary alcohols (the alkyl or cycloalkyl portions of which comprise from about 1 to about 15 carbon atoms) which provide a homopolymer having a $T_g$ equal to or greater than 5° C. Examples include methyl (meth)acrylate, ethyl methacrylate, isobornyl (meth)acrylate, 2-phenoxyethyl (meth)acrylate, and tetrahydrofurfuryl (meth)acrylate. Other high $T_g$ monomers include N-vinyl lactams such as N-vinyl pyrrolidone and N-vinyl caprolactam; vinylidene chloride; vinyl toluene; vinyl esters such as vinyl propionate vinyl acetate, vinyl pivalate, and vinyl neononanoate; styrene; acrylamides such as N,N-dimethyl acrylamide, N,N-diethyl acrylamide, N-isopropyl acrylamide, N-octyl acrylamide, and N-t-butyl acrylamide, acrylonitrile, abitol acrylate, and dicyclopentadienyl (meth)acrylate. Blends of high $T_g$ monomers may be used. Most preferably, the high $T_g$ monomer is isobornyl acrylate, N,N-dimethyl acrylamide, or methyl (meth)acrylate.

When the crystalline macromonomer comprises polymerized units of octadecyl acrylate, a high $T_g$ monomer (such as styrene, isobornyl acrylate, N,N-dimethyl acrylamide, or methyl (meth)acrylate) and optionally a low $T_g$ monomer (such as butyl acrylate, isooctyl acrylate, 2-ethylhexyl acrylate, or lauryl acrylate), it preferably comprises 10 to 80 parts by weight octadecyl acrylate and 90 to 20 parts by weight of the high $T_g$ and optional low $T_g$ monomer. More preferably, the macromonomer comprises 15 to 70 parts by weight octadecyl acrylate, and 85 to 30 parts by weight of the high $T_g$ and optional low $T_g$ monomer. Most preferably, the macromonomer comprises 20 to 65 parts by weight octadecyl acrylate, and 80 to 35 parts by weight of the high $T_g$ and optional low $T_g$ monomer. Preferably, the high $T_g$ and optional low $T_g$ monomers are present in quantities so that the theoretical $T_g$ (calculated using the Fox Equation and taking into consideration the high and low $T_g$ monomers only) is equal to or greater than 5° C. but less than or equal to 100° C., more preferably equal to or greater than 10° C. but less than or equal to 90° C., and most preferably equal to or greater than 20° C. but less than or equal to 80° C. The theoretical $T_g$ is calculated using the Fox Equation which has the general form:

$$1/T_g = \Sigma[M_i/T_{gi}]$$

wherein $M_i$ is the mass fraction of component i and $T_{gi}$ is the glass transition temperature of component i (L. H. Sperling, *Introduction of Physical Polymer Science*, John Wiley & Sons (1986)). By way of example, if 50 parts by weight of one crystalline monomer, 30 parts by weight of one high $T_g$ monomer, and 20 parts by weight of a low $T_g$ monomer are used, then the theoretical $T_g$ for these monomers alone (ignoring the presence of the crystalline monomer) is calculated as follows:

$$1/T_g = (0.6/T_{gh}) + (0.4/T_{gl})$$

where $T_{gh}$ and $T_{gl}$ are the glass transition temperatures of the high $T_g$ and low $T_g$ monomers, respectively.

B. Amorphous Macromonomer

When the macromonomer is amorphous, the monomer(s) of X of Structure 1 is/are preferably selected so that the macromonomer has a theoretical OH# in the range of from 1 to 40, more preferably 2 to 25, most preferably 5 to 15. The effects of venturing outside the broadest ranges are the same as those discussed above for the crystalline macromonomer.

When the macromonomer is amorphous, the monomer(s) of X is/are also preferably selected so that the macromonomer has a theoretical $T_g$ in the range of from 5° C. to 80° C., more preferably 5° C. to 50° C., most preferably 5° C. to 30° C. The theoretical $T_g$ is calculated using the Fox Equation (described above). It is also possible to select monomers comprising curable groups (referred to as "functional monomers") which can increase the crosslinking density of the ultimate adhesive. Examples of functional monomers include glycidyl (meth)acrylate and β-methacryloxy propyl trimethoxysilane.

As the $T_g$ of the macromonomer falls below 5° C., the macromonomer is generally too soft at room temperature in most environments. This may cause an increase in set time and a decrease in the initial creep resistance of the adhesive. As the $T_g$ of the macromonomer increases above 80° C., the adhesive made from this macromonomer becomes less hot melt processable.

X may comprise polymerized units of one or more monomers. When only one monomer is used, then the monomer preferably is a high $T_g$ monomer (such as those described above) that provides a macromonomer that meets the preferred ranges for OH# and $T_g$ given above. More preferably, the high $T_g$ monomer is methyl acrylate, vinyl propionate, or vinyl acetate.

Preferably, when the macromonomer is amorphous, X comprises a copolymer of a low $T_g$ monomer and a high $T_g$ monomer, such as those described hereinabove. More preferably, X comprises a copolymer of low $T_g$ monomers such as butyl acrylate, isooctyl acrylate, 2-ethylhexyl acrylate, or lauryl acrylate and high $T_g$ monomers such as isobornyl acrylate, N,N-dimethyl acrylamide, or methyl methacrylate. In this case, the macromonomer preferably comprises 90 to 10 percent by weight low $T_g$ monomer and 10 to 90 percent by weight high $T_g$ monomer. The amount of monomer(s) used will depend in large part on the $T_g$ of its homopolymer(s). Preferably, the amount of monomer is determined from the Fox Equation to achieve a desired $T_g$.

C. Macromonomer Synthesis

The macromonomer of Structure I may be synthesized using radical or anionic polymerization techniques. Radical polymerization is preferred because there is a greater selection of monomers that can be reacted using this method. In addition, radical polymerization easily yields high molecular weight macromonomers using solvent-free systems.

Radical polymerization typically proceeds by reacting an initiator, monomers, and a chain transfer agent. In this reaction, a chain transfer agent transfers the active site on one growing chain to another molecule which can then start a new chain. An initiator is an agent used to start the polymerization of monomer(s). In one such preferred radical reaction, the hydroxyl groups of the macromonomer are derived from the use of a chain transfer agent having two hydroxyl groups such as dihydroxy mercapto, disulfide or halide compounds. Preferably the chain transfer agent comprises a dihydroxy mercapto compound, examples of which include 2-mercapto-1,2-propanediol, 2-mercapto-2-methyl-1,3-propanediol, 2-mercapto-2-ethyl-1,3-propanediol, 3-mercapto-1,2-propanediol, 1-mercapto-2,2-propanediol, 2-mercaptomethyl-2-methyl-1,3-propanediol, 2-mercaptomethyl-2-ethyl-1,3-propanediol, 2-mercaptoethyl-2-methyl-1,3-propanediol, 2-mercaptoethyl-2-ethyl-1,3-propanediol, etc., which may be used alone or in combination of two or more thereof. Of these, 3-mercapto-1,2-propanediol is preferred because of its commercial availability. The relative amount of chain transfer agent will vary over a wide range and is preferably determined to provide a desired macromonomer OH# using the equation given above.

Using the preferred method described above for synthesis of the macromonomer (wherein the chain transfer agent comprises two hydroxy groups), B of Structure 1 may be described as a fragment of a chain transfer agent, more specifically a thiol group or an alkyl group having two non-tertiary hydroxyl groups. In such case, B preferably has from about 2 to about 20 carbon atoms and two secondary hydroxyl groups, more preferably one primary hydroxyl group and one secondary hydroxyl group, most preferably two primary hydroxyl groups.

Suitable initiators for this reaction include, for example, thermal and photo initiators. Useful thermal initiators include azo compounds and peroxides. Examples of useful azo compounds include 2,2'-azobis(2,4-dimethylpentanenitrile), commercially available from E. I. duPont de Nemours & Co. under the trade designation Vazo 52; 2,2'-azobisisobutyronitrile, commercially available from E. I. duPont de Nemours & Co. under the trade designation Vazo 64; 2,2'-azobis(2-methylbutyronitrile); 1,1'-azobis(1-cyclohexane-1-carbonitrile), commercially available from Wako Pure Chemical Industries, Ltd. under the trade designation V-40; and dimethyl 2,2'-azobisisobutyrate, commercially available from Wako Pure Chemical Industries, Ltd., under the trade designation V-601; examples of useful peroxides include benzoyl peroxide; lauroyl peroxide; and t-butyl peroxy pivalate.

Useful photo initiators include benzoin ethers such as benzoin methyl ether and benzoin butyl ether; acetophenone derivatives such as 2,2-dimethoxy-2-phenyl-acetophenone and 2,2-diethoxy acetophenone; and acylphosphine oxide derivatives and acylphosphonate derivatives such as diphenyl-2,4,6-trimethylbenzoylphosphine oxide, isopropoxy(phenyl)-2,4,6-trimethylbenzoylphosphine oxide, and dimethyl pivaloylphosphonate. Of these, 2,2-dimethoxy-2-phenyl-acetophenone is preferred and typically used at a level of 0.01 to 5 parts by weight per 100 parts by weight monomer(s).

Alternatively, the hydroxyl groups of the macromonomer may be derived from the use of an initiator which provides two hydroxyl groups. One such thermal initiator is 2,2'-azobis{2-methyl-N-[1,1-bis(hydroxy-methyl)ethyl] propionamide}, commercially available from Wako Pure Chemical Industries, Ltd. under the trade designation VA-082. In this case, A in Structure 1 may be described as a fragment of an initiator, more specifically a dihydroxy amide. Suitable chain transfer agents for this reaction should not contain hydroxyl groups and include alkyl thiols such as n-decyl mercaptan, n-dodecyl mercaptan, and t-dodecyl mercaptan; thioglycolic esters of fatty alcohols such as isooctyl thioglycolate; mercaptopropionic esters of fatty alcohols such as isooctyl mercaptopropionate; and alkyl halides such as carbon tetrabromide and carbon tetrachloride.

The macromonomer is preferably synthesized without the use of an organic solvent, for example, using reactive extrusion processing techniques such as described in U.S. Pat. No. 4,619,979. An organic solvent may act as a competing chain transfer agent and reduce the hydroxy functionality of the resulting macromonomer. For example, if the reaction was conducted in isopropanol, the solvent could chain transfer or terminate the polymerized monomers giving rise to loss of hydroxy functionality.

The macromonomer may also be prepared using anionic polymerization methods. These reactions typically proceed by reacting an anionic initiator, monomer(s) and capping agent. Once the polymerized units of monomers is capped by the capping agent, the capping agent is reacted (for example, ring opened) to yield dihydroxy termination.

The initators for these anionic polymerizations are any alkali metal hydrocarbons and alkoxide salts which produce a mono-functional living polymer. Suitable initiators include ethyl sodium, n-propyl sodium, n-butyl potassium, n-octyl potassium, phenyl sodium, ethyl lithium, sec-butyl lithium, t-butyl lithium, 2-ethylhexyl lithium, and potassium t-butoxide.

The capping agents for these anionic polymerization reactions include epihalohydrins wherein the halo group may be chloro, bromo, or iodo, preferably chloro.

The selection of monomers which may be anionically polymerized includes vinyl aromatic compounds, such as styrene, α-methylstyrene, vinyl toluene and its isomers; acrylamides; acenaphthylene; (meth)acrylonitrile; (meth) acrylates such as methyl (meth)acrylate and t-butyl (meth) acrylates; and dienes.

Polyol

The polyol used to make the prepolymer of the invention may be crystalline or amorphous. When the macromonomer is amorphous, however, the polyol is preferably crystalline. Conversely, when the polyol is amorphous, the macromonomer is preferably crystalline. More preferably, the macromonomer is crystalline and mixtures of amorphous and crystalline polyols are used to allow greater flexibility in tailoring the final properties of the composition. In general, the use of crystalline polyols provides crystalline segments to the polyurethane backbone which may contribute to the resulting properties (for example, hot melt adhesive strength) of the graft polyurethane prepolymer.

Typical crystalline polyols provide a $T_m$ value in the range of from room temperature (i.e., 20° C.) to about 135° C. Examples of useful crystalline polyols for the invention include polyoxyalkylene polyols, the alkylene portion of which is a straight chain such as poly(oxyethylene) diol and poly(oxytetramethylene) diol; polyester polyols which are the reaction products of polyol(s) having from 2 to about 12 methylene groups and polycarboxylic acid(s) having from 2 to about 12 methylene groups; and polyester polyols made by ring-opening polymerization of lactones such as ε-caprolactone; and blends thereof. Preferred crystalline polyols are poly(oxytetramethylene) diol, polyhexamethylene adipate diol (made by reacting an excess of 1,6-hexamethylene diol and adipic acid), polyhexamethylene sebacate diol (made by reacting an excess of 1,6-hexamethylene diol and sebacic acid), and polyhexamethylene dodecanedioate diol (made by reacting an excess of 1,6-hexamethylene diol and dodecanedioic acid). Examples of commercially available crystalline polyols include, for example, poly(oxytetramethylene) polyols sold under the tradename TERATHANE (available from E. I. duPont de Nemours & Co.); polyester polyols sold under the tradenames LEXOREZ (available from Inolex Chemical Co.), RUCOFLEX (available from Ruco Polymer Corp.), and FORMREZ (available from Witco Chemical Co.); and polycaprolactone polyols sold under the tradename TONE (available from Union Carbide).

Examples of useful amorphous polyols for use in the invention include polyoxyalkylene polyols, the alkylene portion of which is a branched alkylene such as poly(oxypropylene) diol and poly(oxybutylene) diol; aliphatic polyols such as polybutadiene diol, hydrogenated polybutadiene diol, and poly(ethylene-butylene) diol; polyester polyols formed during reactions between and/or among the following diols and diacids: neopentyl diol, ethylene diol, propylene diol, 1,4-butanediol, 1,6-hexanediol, adipic acid, orthophthalic acid, isophthalic acid, and terephthalic acid; and blends thereof. Preferably, the amorphous polyol is glassy or liquid at room temperature and exhibits a $T_g$ less than or equal to 50° C., more preferably less than or equal to 30° C. Preferred amorphous polyols include poly(oxypropylene) diol; poly(oxybutylene) diol; and poly(ethylene-butylene) diol. Examples of commercially available amorphous polyols include, for example, poly(oxypropylene) diols sold under the tradename ARCOL such as ARCOL 1025 or 2025 (available from Arco Chemical Co.); poly(oxybutylene) diols sold under the tradename POLYGLYCOL such as B100-2000 (available from Dow Chemical Co.); and poly(ethylene-butylene) diol sold as HPVM 2201 (available from Shell Chemical Co.).

It is noted that polyester polyols are listed as possible amorphous and crystalline polyols. This is because polyester polyols may be either crystalline or amorphous, depending on the chemical structure of the polyester polyol.

Various physical properties of the prepolymer may be affected by the selection of polyol. These physical properties include viscosity, open time, flexibility, hydrolytic stability, adhesion, cohesion, etc. In general, amorphous polyols contribute to longer open times, increased flexibility and hydrolytic stability; whereas polyols contribute to semi-structural ultimate strength, and shorter set times. For further discussion of the effect of various polyols on physical properties of polyurethanes, see *Polyurethanes Chemistry and Technology*, J. H. Saunders and K. C. Frisch (John Wiley & Sons, New York, N.Y.).

Polyisocyanate

The term "polyisocyanate" refers to materials having two or more -NCO groups. Useful polyisocyanates for the present invention include organic, aliphatic, cycloaliphatic, and aromatic isocyanate compounds. Preferably, they are aromatic isocyanates such as diphenylmethane-2,4'-diisocyanate and/or diphenylmethane 4,4'-diisocyanate (MDI); tolylene-2,4-diisocyanate and -2,6-diisocyanate (TDI) and mixtures thereof. Other examples include: naphthylene-1,5-diisocyanate; triphenylmethane-4,4',4"-triisocyanate; 2,4 (or 2,4/2,6) toluene diisocyanate; 1,4-phenylene diisocyanate; 4,4'-cyclohexylmethane diisocyanate ($H_{12}$MDI); hexamethylene-1,6-diisocyanate (HDI); isophorone diisocyanate (IPDI); tetramethylxylene diisocyanate; and xylene diisocyanate. Of these, MDI is preferred.

A list of useful commercially available polyisocyanates is found in the *Encyclopedia of Chemical Technology*, Kirk-Othmer, 4th. Ed., Vol. 14, p.902–925, John Wiley & Sons, New York (1995).

Silane Reagent

Useful silane reagents for preparing silane functional prepolymers from NCO-terminated prepolymers may be amine-, hydroxy- or thiol-functional. In general, they have the formula $RSiY_3$ wherein: R is a hydrocarbon group (e.g., an alkyl, alkenyl, aryl or alkaryl group) having primary or secondary amine-, hydroxy- or thiol-functionality; and Y is a monovalent heteroalkyl or aryl group such as a dialkylketoxamino group (e.g., methylethylketoxamino, dimethylketoxamino, or diethylketoxamino), alkoxy group (e.g., methoxy, ethoxy, or butoxy), alkenoxy group (e.g., isopropenoxy), acyl group (e.g., acetoxy), alkamido group (e.g., methylacetamido or ethylacetamido), or arylamido group (e.g., benzamide).

Particularly preferred silane reagents are dialkylketoaminosilanes because they exhibit good shelf-stability and do not form deleterious byproducts upon cure. Examples include 3-aminopropyltris(methylethylketoxime) silane and (3-aminopropyl)trialkoxysilane.

Silane-terminated prepolymers may also be made using a one step method by reacting one or more dihydroxy functional macromonomer(s), one or more polyol(s), one or more polyisocyanate(s), and one or more isocyanate-terminated silane(s). Isocyanate-terminated silanes include isocyanatoalkyl silanes such as (3-isocyanatopropyl) trialkoxysilanes including (3-isocyanatopropyl) triethoxysilane, (3-isocyanatopropyl) trimethoxysilane, etc. One commercially available material is isocyanatopropyl triethoxysilane available from Silar Laboratories (Scotia, N.Y.).

Graft Polyurethane Prepolymer

The graft polyurethane prepolymer may be prepared by techniques known in the art. Typically, the components are mixed at an elevated temperature, using conventional mixing techniques. It is preferred to mix the components under anhydrous conditions to prevent premature moisture curing. Generally, the prepolymers are prepared without the use of solvents.

To make NCO-terminated prepolymers, the isocyanate equivalents should be present in the reaction mixture in an amount greater than that of the hydroxyl equivalents. The equivalent ratio of isocyanate to hydroxyl groups should be at least 1.2/1, more preferably 1.2/1 to 10/1, most preferably 1.5/1 to 2.2/1.

When a crystalline macromonomer or mixture of crystalline macromonomers is used to make the composition of the invention, then preferably 5 to 2000 parts by weight macromonomer are reacted with 100 parts by weight polyol, wherein the 100 parts by weight polyol comprise 0 to 100 parts by weight crystalline polyol and 0 to 100 parts by weight amorphous polyol. More preferably, 25 to 300 parts by weight crystalline macromonomer are reacted with 100 parts by weight polyol, wherein the 100 parts by weight polyol comprise 10 to 90 parts by weight crystalline polyol and 10 to 90 parts by weight amorphous polyol. Most preferably, 40 to 150 parts by weight crystalline macromonomer are reacted with 100 parts by weight polyol, wherein the 100 parts by weight polyol comprise 20 to 80 parts by weight crystalline polyol and 20 to 80 parts by weight amorphous polyol.

When an amorphous macromonomer or mixture of amorphous macromonomers is used to make the composition of the invention, then preferably 10 to 1000 parts by weight amorphous macromonomer are reacted with 100 parts by weight polyol, wherein the 100 parts by weight of polyol comprise 15 to 100 parts by weight crystalline polyol and 0 to 85 parts by weight amorphous polyol. More preferably, 25 to 300 parts by weight amorphous macromonomer are reacted with 100 parts by weight polyol, wherein the 100 parts by weight polyol comprise 20 to 90 parts by weight crystalline polyol and 10 to 80 parts by weight amorphous polyol. Most preferably, 40 to 150 parts by weight amorphous macromonomer are reacted with 100 parts by weight polyol, wherein the 100 parts by weight polyol comprise 25 to 80 parts by weight crystalline polyol and 20 to 75 parts by weight amorphous polyol.

Various adjuvants or other ingredients may be added to the graft polyurethane prepolymer to impart or modify particular characteristics of the ultimate adhesive composition. The adjuvants should be added only at a level that does not materially adversely interfere with the adhesion or cause premature curing of the composition. For example, fillers (e.g. carbon black; fibers; glass, ceramic, metal or plastic bubbles; metal oxides such as zinc oxide; and minerals such as talc, clays, silica, silicates, and the like); tackifiers; plasticizers; antioxidants; pigments; UV absorbers; and adhesion promoters, and the like may be added to modify adhesion, strength build-up, tack, flexibility, etc.

Because polyurethane prepolymers are moisture reactive, it is important to package and store them under moisture-free conditions. Oftentimes, for example, such materials are packaged under a dry atmosphere into moisture-proof cartridges, pails, etc.

Typical temperatures for hot melt dispensing of the polyurethane prepolymers are less than 135° C. (275° F.), since the urethane linkage may begin to decompose and residual isocyanate compounds (if any) may begin to vaporize at higher temperatures.

Hot melt dispensing systems which may be used include, for example, handheld glue guns, heated platen unloaders for drums or pails, heated reservoirs equipped with a pump, and the like. The polyurethane prepolymer may also be packaged in small pouches or tubes which may be heated, for example, by immersing in hot water. The molten adhesive is then squeezed from the pouch or tube.

The viscosity of the graft polyurethane prepolymer is preferably less than 50,000 cps at 120° C. (250° F.), more preferably less than 20,000, to enable easy hot melt dispensing using typical handheld glue gun applicators. The viscosity of the graft polyurethane prepolymer is formulation dependent. For example, the use of a tackifier may lower the viscosity of the resulting adhesive composition.

The adhesive may be used to form bonds between many different substrates including plastics, wood, ceramics, glass, paper, metal, etc. In some instances, it may be desirable to apply a surface treatment (such as a primer, mechanical abrasion, and the like) to improve wettability of the adhesive on the surface and enhance adhesion.

The invention may be further illustrated by the following non-limiting examples. Examples 1–26 describe the preparation and testing of various macromonomers. Examples 27–53 describe the preparation and testing of various adhesives made from amorphous macromonomers. Comparative Examples C-1 and C-2 demonstrate a physical blend of an amorphous polymer with a polyurethane prepolymer. Examples 54–67 describe the preparation and testing of various adhesives made from crystalline macromonomers. Comparative Examples C-3 and C-4 describe the preparation and testing of conventional moisture-curable, hot melt adhesives. Table 14 shows a comparison of the properties of a conventional moisture-curable, hot melt adhesive and adhesives of the invention comprising amorphous and crystalline macromonomers.

MACROMONOMER EXAMPLES

INDEX OF ABBREVIATIONS

| | |
|---|---|
| IOA | isooctyl acrylate |
| IBA | isobornyl acrylate |
| ODA | octadecyl acrylate |
| NNDMA | N,N-dimethyl acrylamide |
| MPD | 3-mercapto-1,2-propanediol |
| KB-1 | 2,2-dimethoxy-2-phenyl-acetophenone (available from Sartomer Co. under the trade designation of "Esacure KB-1") |
| Vazo 52 | 2,2'-azobis(2,4-dimethylpentanenitrile initiator (available from E. I. duPont de Nemours & Co.) |
| UV | Ultra-violet |

TEST METHODS FOR CHARACTERIZATION OF THE MACROMONOMERS

Glass Transition Temperature ($T_g$)

$T_g$ was determined either mathematically using the Fox Equation or measured by dynamic mechanical analysis (DMA). To determine $T_g$ using DMA, dynamic oscillatory measurements were performed at a frequency of 1 Hertz using a Rheometrics RDA II and a parallel plate fixture having a diameter of 7.9 mm. The sample was scanned from −70° C. to 100° C. at increments of 5° C. and held isothermally for 60 seconds prior to data acquisition. The peak of G" (loss modulus) versus temperature was reported as $T_g$.

Melting Point ($T_m$)

$T_m$ was quantitatively determined by measuring changes in specific volume and heat capacity through differential scanning calorimetry (DSC). More particularly, $T_m$ was measured with a Perkin-Elmer 7 Series Thermal Analysis System programmed to scan at a rate of 20° C./minute. $T_m$ was considered to be the temperature at the apex of the endothermic peak. This technique is described more fully in *Thermal Characterization of Polymeric Materials*, edited by Edith A. Turi (published 1981 by Academic Press, New York, N.Y.).

Theoretical Hydroxyl Number (OH#)

The hydroxyl number was calculated from the following equation:

$$OH\# = 5611 \times W_a / (W_b \times W_c)$$

wherein:

$W_a$ is the weight of the component containing hydroxyl groups used to make the macromonomer;

$W_b$ is the hydroxyl equivalent weight of the component containing hydroxyl groups used to make the macromonomer; and $W_c$ is the total weight of the components used to make the macro monomer.

Average Molecular Weight ($M_n$)

The number average molecular weight ($M_n$) was determined by size exclusion chromatography using tetrahydrofuran solvent and polystyrene standards. Size exclusion chromatography is also known as gel permeation chromatography (GPC). GPC test methods are explained in *Modern Size Exclusion Liquid Chromatography, Practice of Gel Permeation Chromatography*, John Wiley & Sons, 1979.

Percent Conversion

The percent conversion of the monomers into macromonomer was determined by weighing out a small amount of polymerized reaction mixture in a small dish ($W_1$). The dish was then placed in an air-circulating oven at 120° C. for 6 hrs. then weighed again ($W_2$). The % Conversion was then calculated from the following:

$$\% \text{Conversion} = \frac{W_2}{W_1} \times 100$$

GENERAL PREPARATION OF AMORPHOUS MACROMONOMER

The amorphous macromonomers used in the examples were prepared by UV polymerization unless otherwise stated.

The monomer(s), KB-1, and MPD, were placed in a glass bottle and the contents were purged with nitrogen for about 15 minutes. The bottle was then placed in ice water with continuous nitrogen purge. While rotating the bottle, the contents were exposed to low intensity UV radiation provided by a Sylvania black light for about 30 minutes. The black light provided an average intensity on the order of 2–3 milliwatts/cm$^2$ (emitting between 300–400 nanometers). The radiation was then terminated and the percent conversion determined.

GENERAL PREPARATION OF CRYSTALLINE MACROMONOMER

The crystalline macromonomers used in the examples were prepared by thermal polymerization.

The monomer(s), Vazo 52, and MPD were placed in a glass bottle and the contents were purged with nitrogen for about 10 minutes. An 18 mm diameter Leistritz counter-rotating, fully intermeshing twin screw extruder was used as the reactor. The rotational speed of the screw was set at 50 rpm, and the monomer feed rate of 5.4, 8.0, or 8.1 grams/minute was used. In addition, the eight zone temperatures had the following settings: Zone 1—60° C., Zone 2—80° C., Zone 3—90° C., Zone 4—95° C., Zone 5—100° C., Zone 6—100° C., Zone 7—110° C., and Zone 8—110° C. unless otherwise stated. These extrusion conditions resulted in a torque from 1 to 3 Newton-meters (Nm), % Torque from 8 to 19%, and melt pressure of 0.0 to 21.0 kg/sq. cm. (0 to 300 psi).

EXAMPLES 1–5, 5A, 5B, AND 5C

In these examples, macromonomers with various $T_g$s were prepared by UV polymerization.

A series of amorphous macromonomers was made according to the General Preparation of Amorphous Macromonomer described above. The amount of KB-1 in each example was 0.14 parts by weight. The % conversion, theoretical $T_g$ (calculated using the Fox Equation), $T_g$ (measured using DMA), average molecular weight, and theoretical OH# were determined for each macromonomer according to the test methods outlined above. Results are reported in Table 1 below. Component amounts are reported in parts by weight.

TABLE 1

| Component | Ex. 1 | Ex. 2 | Ex. 3 | Ex. 4 | Ex. 5 | Ex. 5A | Ex. 5B | Ex. 5C |
|---|---|---|---|---|---|---|---|---|
| IOA | 53 | 40 | 34 | 31 | 20 | 53 | 46.8 | 10 |
| IBA | 47 | 60 | 66 | 69 | 80 | 47 | 53.2 | 90 |
| MPD | 2 | 1 | 2 | 1 | 1 | 1 | 1 | 1 |
| Conversion | 99.0 | 98.4 | 99.2 | 99.4 | 99.7 | 97.8 | 99.2 | 99.8 |
| Theoretical $T_g$ (°C.) | 0 | 15 | 25 | 30 | 50 | 0 | 5 | 70 |
| $T_g$ (°C.) by DMA (1) | N/M(2) | 15.7 | N/M | N/M | N/M | N/M | N/M | N/M |
| $M_n$ | 5860 | 8040 | 5840 | 5360 | 5200 | N/M | N/M | 5200 |
| OH # | 20.35 | 10.27 | 20.35 | 10.27 | 10.27 | 10.27 | 10.27 | 10.27 |

1) Dynamic Mechanical Analysis, Peak of G" (loss modulus)
2) Not measured.

This example illustrates the preparation of amorphous macromonomers having different $T_g$s. Example 2 also demonstrates that the theoretical $T_g$ (calculated using the Fox Equation) was found to be very similar to the $T_g$ measured using DMA.

EXAMPLES 6–9

In these examples, macromonomers having different OH#s were prepared. Examples 6, 7, and 8 were made according to the General Preparation of Amorphous Macromonomer described above. The amount of KB-1 in each example was 0.14 parts by weight. Example 9 was made as described above in the General Preparation of Crystalline Macromonomers except that temperature Zones 2, 5, and 6 were set at 85° C., 105° C., and 110° C. respectively, and the monomer feed rate was 5.4 grams/minute. Example 9 contained 0.14 parts by weight of Vazo 52. The % conversion, theoretical $T_g$, $M_n$, and theoretical OH# were determined for each macromonomer according to the test methods outlined above. Results are reported in Table 2 below. Component amounts are reported in parts by weight.

TABLE 2

| Component | Ex. 6 | Ex. 7 | Ex. 8 | Ex. 9 |
|---|---|---|---|---|
| IOA | 40 | 40 | 40 | 40 |
| IBA | 60 | 60 | 60 | 60 |
| KB-1 | 0.14 | 0.14 | 0.14 | 0 |
| Vazo 52 | 0 | 0 | 0 | 0.14 |
| MPD | 0.2 | 0.5 | 2 | 1 |
| % Conversion | 98.9 | 98.4 | 98.1 | 98.4 |
| Theoretical $T_g$ (° C.) | 15 | 15 | 15 | 15 |
| $M_n$ | 15400 | 12000 | 5480 | 7790 |
| OH # | 2.07 | 5.16 | 20.35 | 10.27 |

These examples illustrate the preparation of macromonomers having different OH#s using thermal and UV methods.

EXAMPLES 10–11

In these examples, the OH# was determined by titration and compared to the value obtained by calculation. Titration was performed by reacting the sample with excess phenyl isocyanate in the presence of catalyst for four hours. Excess dibutylamine was added and the residual amine titrated potentiometrically with standard isopropanolic hydrochloric acid. The OH# obtained from this procedure was corrected for the water content in the sample, determined as follows: Samples were weighed out in dried septum vials and dissolved in freshly opened chloroform. All sample and solvent transfers were done in a dry box and solvent blanks were carried. The solutions were put on a wrist-action shaker for 4 hours, then analyzed by Karl Fischer titration. Water content was calculated based on the sample weight, solvent weight, solvent blank and water in the sample solution.

The OH# titration value reported in Table 3 was the average of replicate determinations corrected for water content.

Two amorphous macromonomers were made according to the General Preparation of Amorphous Macromonomers described above. Each macromonomer was made by reacting 40 parts by weight IOA, 60 parts by weight IBA, 1 part by weight MPD, and 0.14 parts by weight KB-1. The % conversion, theoretical $T_g$, $M_n$, and theoretical OH# were determined for each macromonomer according to the test methods outlined above. Results are reported in Table 3 below.

TABLE 3

|  | Ex. 10 | Ex. 11 |
|---|---|---|
| % Conversion | 99.2 | 98.7 |
| $T_g$ (° C.) | 15 | 15 |
| $M_n$ | 6590 | 6460 |
| OH # theoretical | 10.27 | 10.27 |
| OH # titration | 11.2 | 10.5 |

These examples illustrate that the theoretical OH# provides a fairly good estimate of the OH# determined by titration.

EXAMPLES 12–19

In these examples, crystalline macromonomers with various melting points were prepared according to the General Preparation of Crystalline Macromonomer using a monomer feed rate of 8.0 grams/minute. Each example was made using 0.2 parts by weight MPD and 0.1 parts by weight Vazo 52 with the other components (ODA, IOA, and NNDMA) listed in Table 4. Each example had a theoretical OH# of 2.07. The % conversion, $T_m$, and $M_n$ were determined for each macromonomer according to the test methods outlined above. Results are reported in Table 4 below. The amount of ODA, IOA, and NNDMA used in each example is also reported in Table 4 in parts by weight.

TABLE 4

|  | Ex. 12 | Ex. 13 | Ex. 14 | Ex. 15 | Ex. 16 | Ex. 17 | Ex. 18 | Ex. 19 |
|---|---|---|---|---|---|---|---|---|
| ODA | 65 | 65 | 65 | 65 | 65 | 65 | 60 | 50 |
| IOA | 35 | 26.25 | 17.5 | 10 | 8.75 | 0 | 11.4 | 14.3 |
| NNDMA | 0 | 8.75 | 17.5 | 25 | 26.25 | 35 | 28.6 | 35.7 |
| % Conversion | 95.7 | 96.2 | 97.1 | 96.5 | 97.3 | 95.9 | 96.9 | 96.7 |
| $M_n$ | 27300 | 32400 | 36400 | 29100 | 35800 | 57000 | 52900 | 45500 |
| $T_m$ (°C.) | 29.9 | 33.5 | 36.1 | 39.4 | 39.1 | 41.4 | 37.6 | 34.3 |

EXAMPLES 20–26

In these examples, crystalline macromonomers with various hydroxyl numbers were prepared according to the General Preparation of Crystalline Macromonomer using a monomer feed rate of 8.1 grams/minute. Each example was prepared using 50 parts by weight of ODA, 14.3 parts by weight of IOA, 35.7 parts by weight of NNDMA, 0.1 parts by weight of Vazo 52, with the amount of MPD listed in Table 5 in parts by weight. The % conversion, average molecular weight, $T_m$, and theoretical OH# were determined for each macromonomer according to the test methods outlined above. Results are reported in Table 5 below.

TABLE 5

|  | Ex. 20 | Ex. 21 | Ex. 22 | Ex. 23 | Ex. 24 | Ex. 25 | Ex. 26 |
|---|---|---|---|---|---|---|---|
| MPD | 2.5 | 1.8 | 1.0 | 0.5 | 0.2 | 0.1 | 0.03 |
| % Conversion | 95.4 | 96.5 | 96.5 | 96.6 | 96.2 | 96.7 | 97.6 |
| $M_n$ | 4150 | 5350 | 8500 | 15600 | 23200 | 26200 | 20500 |
| $T_m$ (°C.) | 33.4 | 32.5 | 30.2 | 30.8 | 30.0 | 30.5 | 30.6 |
| OH# | 25.3 | 18.35 | 10.28 | 5.16 | 2.07 | 1.04 | 0.31 |

MOISTURE-CURABLE HOT MELT ADHESIVE EXAMPLES

INDEX OF ABBREVIATIONS

Crystalline Polyols

| | |
|---|---|
| Rucoflex S105-30 | Poly(hexamethylene adipate) diol having an OH# of 30 available from Ruco Polymer Corp. |
| Rucoflex S105-22 | Poly(hexamethylene adipate) diol having an OH# of 22 available from Ruco Polymer Corp. |
| Dynacoll 7380 | Polyester Polyol reported to have an OH# of 30 and $T_m$ of 74° C. from the manufacturer's literature available from Huls America |
| Terathane 2000 | Poly(tetramethylene ether) diol having an OH# of 55 available from E. I. duPont de Nemours & Co., Inc. |
| Terathane 1000 | Poly(tetramethylene ether) diol having an OH# of 115 available from E. I. duPont de Nemours & Co., Inc. |

Amorphous Polyols

| | |
|---|---|
| Arcol PPG 2025 | Poly(oxypropylene) diol having an OH# of 55 available from Arco Chemical Co. |
| Arcol PPG 1025 | Poly(oxypropylene) diol having an OH# of 113 available from Arco Chemical Co. |
| Polyglycol B100-2000 | Poly(butylene oxide) diol having an OH# of 57 available from Dow Chemical Co. |
| HPVM 2201 | Ethylene/butylene diol having an OH# of 25.5 available from Shell Chemical Co. |

Catalyst

| | |
|---|---|
| Thancat DMDEE | (4,4'-oxydi-2,1-ethanediyl) bismorpholine available from Texaco Chemical Co. |

Isocyanate

| | |
|---|---|
| MDI | 4,4'-diphenylmethane diisocyanate available from Bayer |

Tackifying Resin

| | |
|---|---|
| Abitol | Primary alcohol of abietic acid having an OH# of 194 available from Hercules, Inc. |

Other

| | |
|---|---|
| NCO/OH Ratio | Equivalent ratio of NCO to OH |

Test Methods for Characterization of the Moisture-Curable Hot Melt Adhesives Viscosity The viscosity was measured at 121° C. (250° F.) using a Brookfield Viscometer, #27 spindle, and 10 RPM unless otherwise specified.

Initial Creep Resistance

A 0.5 g (±0.05 g) quantity of the hot melt composition to be tested was extruded at about 121° C. (250° F.) onto one end portion of a 2.5 cm (1 inch) wide×10 cm (4 inches) long×0.3 cm (0.125 inch) thick isopropanol-wiped acrylonitrile/butadiene/styrene (ABS) panel (commercially available from Precision Punch, Minneapolis, Minn.). After the adhesive was applied, 0.08–0.13 mm (3–5 mils) diameter glass beads were sparingly sprinkled on the adhesive to control the thickness of the bondline. The test sample was then formed by mating the substrate with another piece of ABS to form a 6.45 cm² (1 sq. inch) overlap bond area. Firm hand pressure was applied to compress the adhesive to a thickness of 0.08–0.13 mm (3–5 mils) and to squeeze excess composition from the bond area. After 30 seconds or 1 minute, a 0.45 kg (1 pound) weight was attached to one end of the sample and the sample was suspended in a vertical position at room temperature (about 25° C.). After 30 minutes, the Initial Creep Resistance was determined as the distance in millimeters (mm) that the weight-bearing substrate had moved from its original position. The value reported was the average of at least 2 samples.

Overlap Shear Strength

A 0.5 g (±0.05 g) quantity of the hot melt composition to be tested was extruded at about 121° C. (250° F.) onto one end portion of a 2.5 cm (1 inch) wide×10 cm (4 inches) long×0.3 cm (0.125 inch) thick ABS or a 2.5 cm (1 inch) wide×10 cm (4 inches) long×0.8 cm (0.31 inch) thick section of smooth maple panel (commercially available from Martin Lumber, St. Paul, Minn.). After the adhesive was applied, 0.08–0.13 mm (3–5 mils) diameter glass beads were sparingly sprinkled on the adhesive to control the thickness of the bondline. The test sample was then formed by mating the substrate with another piece of material of the same composition to form a 3.22 cm² (½ sq. inch) overlap bond area. Firm hand pressure was applied to compress the adhesive to a thickness of 0.08–0.13 mm (3–5 mils) and to squeeze excess composition from the bond area. The bonded substrates were conditioned at about 25° C. and 50% relative humidity for 7 days. The samples were analyzed using a SINTECH tensile tester at a crosshead speed of 5 cm (2 inches) per minute. Overlap Shear Strength was reported as the average of three to four samples.

Peel Strength

The hot melt composition to be tested was extruded at about 121° C. (250° F.) onto the center portion of a series of 2.5 cm (1 inch) wide×10 cm (4 inch) long×0.3 cm (0.125 inch) thick pieces of isopropanol-wiped ABS. Immediately, a separate piece of 3.8 cm (1.5 inches) wide by 28.5 cm (12 inches) long piece of canvas was bonded to each ABS substrate using a press at 0.7 MPa for 15–20 seconds. This was sufficient pressure to force the adhesive to cover the entire bond area and squeeze excess composition out of the edges of the bond area. The bonded substrates were then conditioned at about 25° C. and 50% relative humidity for 7 days. The canvas was then trimmed to a 2.5 cm (1 inch) width, and the resulting samples were analyzed using an INSTRON tensile tester. The ABS was secured to the fixed lower jaw and the canvas secured to the moveable upper jaw, and the 180 degree angle peel strength was measured using a crosshead speed of 5 cm (2 inches) per minute. Peel Strength was recorded as the average of the high and low readings for three to four samples.

Set Time

A 0.5 g (±0.05 g) quantity of the hot melt composition to be tested was extruded at about 121° C. (250° F.) onto the center portion (about 5 cm from each end) of a 2.5 cm (1 inch) wide×10 cm (4 inches) long×0.8 cm (0.31 inch) thick section of smooth fir panel (commercially available from Martin Lumber, St. Paul, Minn.). A timer was started. After 10 seconds, a second piece of fir was bonded on its center point and at right angles to the first piece. Firm hand pressure was used to mate the surfaces and squeeze excess composition from the bond area.

A 2.27 kg (5 lb) tensile load was applied to the 6.45 cm$^2$ bond area. If the bond could not support the load for 120 seconds, the procedure was repeated with new bonded samples which were allowed to set for various time intervals prior to application of the load. The set time was recorded as the shortest time interval required for the bond to support the 2.27 kg load for 120 seconds. Longer elapsed times indicate slower set times. Values reported are the average of a range of set times observed. Testing was continued until two consecutive samples displayed the same set time.

Open Time

Single-ply corrugated cardboard was cut to approximately 33 cm by 28 cm. A natural fold ran parallel to one of the 28 cm sides, 15 cm from the edge of one of the 28 cm sides. The 15 cm×28 cm portion was cut into a series of approximately 6 cm×15 cm flaps. A bead of the hot melt composition to be tested (approximately 3 mm in diameter) was extruded at a temperature of about 121° C. (250° F.) onto the cardboard at a distance about 4 cm from the 28 cm uncut side (i.e., the side lacking the flaps). A timer was started immediately after the composition was applied. After a specified amount of time elapsed, one of the flaps was folded over onto the bead of material and moderate hand pressure was maintained for about 5 seconds. After 30 minutes at room temperature, the bond was broken and the flap was then examined for evidence of cardboard substrate failure (tearing of the cardboard surface). The test was repeated (using a different flap each time) except that longer time intervals passed before the flap was applied to the adhesive. The test was concluded when evidence of substrate failure was no longer observed. The maximum amount of time the adhesive could sit before application of the flap and still give rise to substrate failure was designated as the "open time".

General Preparation of Moisture-Curable Hot Melt Adhesive Using Amorphous Macromonomer(s)

The amorphous macromonomer(s), crystalline polyol(s), and amorphous polyol(s) if employed were separately heated at about 121° C. (250° F.) under vacuum for at least 4 hours prior to mixing. MDI and the molten amorphous macromonomer(s) were added to a 600 ml stainless steel reactor fitted with a gas inlet adapter, a cover having a rubber gasket, a gas inlet, a stirrer opening, and a stirring rod. These were mixed for about 15 minutes under a dry nitrogen blanket at 100–120° C. Then, each of the molten hydroxy-containing components was added in turn as follows: amorphous polyol(s) if employed and crystalline polyol(s). Stirring and heating under dry nitrogen were continued for about 5 minutes between each addition with the heating and stirring being maintained during the additions. Then Thancat DMDEE was added. Stirring was continued under vacuum for about 30 minutes. Heating at 100–120° C. was maintained throughout. The resulting mixture was poured into dry nitrogen-purged metal containers which were then sealed. The containers were stored in a desiccator.

General Preparation of Moisture-Curable Hot Melt Adhesive Using Crystalline Macromonomer(s)

The crystalline macromonomer(s), crystalline polyol(s), and amorphous polyol(s) if employed were heated at about 121° C. (250° F.) under vacuum for at least 4 hours prior to mixing. MDI and the molten crystalline macromonomer(s), molten crystalline polyol(s), and molten amorphous polyol (s) were added to the reactor described above and mixed under a dry nitrogen blanket at 100–120° C. for about 10 minutes. Then Thancat DMDEE was added. Stirring was continued under vacuum for about 30 minutes. Heating at 100–120° C. was maintained throughout. The resulting mixture was poured into dry nitrogen-purged metal containers which were then sealed. The containers were stored in a desiccator.

EXAMPLES 27–39

A series of moisture-curable hot melt adhesives using amorphous macromonomer was made as described above in the General Preparation of the Moisture-Curable Hot Melt Adhesive Using Amorphous Macromonomer(s). The NCO/OH ratio of each example was 2.0. Each example included 0.2 weight % of Thancat DMDEE. Each adhesive was tested for viscosity, initial creep resistance, open time, set time, and overlap shear (OLS) strength on maple substrates. Results are reported in Table 6 below. Component values are reported in parts by weight.

TABLE 6

| Component | Ex. 27 | Ex. 28 | Ex. 29 | Ex. 30 | Ex. 31 | Ex. 32 | Ex. 33 | Ex. 34 | Ex. 35 | Ex. 36 | Ex. 37 | Ex. 38 | Ex. 39 |
|---|---|---|---|---|---|---|---|---|---|---|---|---|---|
| Amorphous Macromonomer Ex. 2 | 70 | 60 | 40 | 30 | 91 | 10 | 50 | 48.5 | 50 | 50 | 35 | 55 | 75 |
| Crystalline Polyol | | | | | | | | | | | | | |
| Rucoflex S105-30 | 0 | 0 | 0 | 0 | 0 | 35 | 25 | 24.3 | 25 | 0 | 45.8 | 29.2 | 12.5 |
| Rucoflex S1 05-22 | 0 | 0 | 6 | 15 | 0 | 0 | 0 | 0 | 0 | 28 | 0 | 0 | 0 |
| Dynacoll 7380 | 1.5 | 6 | 14 | 15 | 4 | 10 | 5 | 4.9 | 5 | 12 | 9.2 | 5.8 | 2.5 |

TABLE 6-continued

| Component | Ex. 27 | Ex. 28 | Ex. 29 | Ex. 30 | Ex. 31 | Ex. 32 | Ex. 33 | Ex. 34 | Ex. 35 | Ex. 36 | Ex. 37 | Ex. 38 | Ex. 39 |
|---|---|---|---|---|---|---|---|---|---|---|---|---|---|
| Terathane 2000 | 0 | 0 | 0 | 0 | 0 | 0 | 0 | 9.7 | 10 | 0 | 5 | 5 | 5 |
| Terathane 1000 | 0 | 0 | 0 | 0 | 0 | 0 | 0 | 0 | 0 | 0 | 5 | 5 | 5 |
| Amorphous Polyol Arcol PPG202 | 28.5 | 34 | 40 | 40 | 0 | 45 | 20 | 9.7 | 10 | 10 | 0 | 0 | 0 |
| Polyglycol B100–2000 | 0 | 0 | 0 | 0 | s | 0 | 0 | 2.9 | 0 | 0 | 0 | 0 | 0 |
| Crystalline Polyols (wt %) | 5 | 15 | 33 | 43 | 44 | 50 | 60 | 75.5 | 80 | 80 | 100 | 100 | 100 |
| Amorphous Polyols (wt %) | 95 | 85 | 67 | 57 | 56 | 50 | 40 | 24.5 | 20 | 20 | 0 | 0 | 0 |
| Amorphous Macromonomer (parts per 100 polyols) | 233 | 150 | 67 | 43 | 1011 | 11 | 100 | 94 | 100 | 100 | 54 | 122 | 300 |
| Viscosity (cps) | 4520 | 3600 | 2000 | 2800 | 11100 | 1750 | 14800 | 13100 | 23400 | 21500 | 11100 | 40200 | 24100 |
| Initial Creep (mm) <Elapsed time before hanging weight> | | | | | | | | | | | | | |
| 30 sec. | >25 | >25 | 0 | 0 | 4 | >25 | 3 | >25 | 4 | 0 | 0 | 0 | 1.5 |
| 1 min. | >25 | 0.5 | 0 | 0 | 0.5 | 0 | 0 | 1 | 0 | 0 | 0 | 0 | 0.5 |
| Open time (minutes) | >60 | >60 | 20 | 5 | 25 | 5 | 50 | >60 | 50 | 40 | 1.67 | 18.5 | 30 |
| Set time (seconds) | >150 | 50 | 20 | 20 | 30 | 20 | 30 | 30 | 30 | 20 | 10 | 10 | 20 |
| OLS strength kg/cm$^2$ (psi) Maple | 38.3 (545) | 58.1 (826) | 47.7 (678) | 74.2 (1055) | 59.3 (844) | 74.0 (1053) | 76.0 (1081) | 74.2 (1056) | 73.2 (1041) | 80.2 (1141) | 102.2 (1454) | 78.6 (1118) | 66.9 (952) |

Preferred adhesive compositions show less than 1 mm creep using a one minute lapse time before hanging the weight, a set time of less than 60 seconds, and an open time of greater than five minutes. The data demonstrate that all Examples except Examples 27 and 37 met these preferred ranges. It is noted that Example 27 showed much less desirable properties than other examples, possibly due to the relatively lower amount of crystalline polyol used to make this adhesive. Example 37 showed an open time less than 5 minutes, possibly due to the use of lower amounts of amorphous macromonomer with a system comprising only crystalline polyols. It is also noted that Examples 27 and 37 would still be useful in applications where less rigorous performance properties are required.

The data suggest that when an amorphous macromonomer is utilized as a component in the moisture-curable hot-melt adhesive of the invention, it is preferred that at least 15% by weight of the total amount of polyol be crystalline.

EXAMPLES 40–50

Moisture-curable hot melt adhesives were prepared and tested as in Examples 27–39 using a variety of amorphous macromonomers having different theoretical $T_g$ and theoretical OH# numbers. Each adhesive was also tested for overlap shear (OLS) strength on ABS substrates and Peel Strength. Results are reported in Table 7 below.

TABLE 7

| | Ex. 40 | Ex. 41 | Ex. 42 | Ex. 43 | Ex. 44 | Ex. 45 | Ex. 46 | Ex. 47 | Ex. 48 | Ex. 49 | Ex. 50 |
|---|---|---|---|---|---|---|---|---|---|---|---|
| Amorphous Macromonomer | | | | | | | | | | | |
| Ex. 5A ($T_g = 0$, OH# = 10.27) | 50 | 0 | 0 | 0 | 0 | 0 | 0 | 0 | 0 | 0 | 0 |
| Ex. 1 ($T_g = 0$, OH# = 20.35) | 0 | 50 | 0 | 0 | 0 | 0 | 0 | 0 | 0 | 0 | 0 |
| Ex. 5B ($T_g = 5$, OH# = 10.27) | 0 | 0 | 50 | 0 | 0 | 0 | 0 | 0 | 0 | 0 | 0 |
| Ex. 6 ($T_g = 15$, OH# = 2.07) | 0 | 0 | 0 | 50 | 0 | 0 | 0 | 0 | 0 | 0 | 0 |
| Ex. 7 ($T_g = 15$, OH# = 5.16) | 0 | 0 | 0 | 0 | 50 | 0 | 0 | 0 | 0 | 0 | 0 |
| Ex. 2 ($T_g = 15$, OH# = 10.27) | 0 | 0 | 0 | 0 | 0 | 50 | 50 | 0 | 0 | 0 | 0 |

TABLE 7-continued

|  | Ex. 40 | Ex. 41 | Ex. 42 | Ex. 43 | Ex. 44 | Ex. 45 | Ex. 46 | Ex. 47 | Ex. 48 | Ex. 49 | Ex. 50 |
|---|---|---|---|---|---|---|---|---|---|---|---|
| Ex. 8 ($T_g$ = 15, OH# = 20.35) | 0 | 0 | 0 | 0 | 0 | 0 | 0 | 50 | 0 | 0 | 0 |
| Ex. 4 ($T_g$ = 30, OH# = 10.27) | 0 | 0 | 0 | 0 | 0 | 0 | 0 | 0 | 50 | 0 | 0 |
| Ex. 5 ($T_g$ = 50, OH# = 10.27) | 0 | 0 | 0 | 0 | 0 | 0 | 0 | 0 | 0 | 40 | 0 |
| Ex. 5C ($T_g$ = 70, OH# = 10.27) | 0 | 0 | 0 | 0 | 0 | 0 | 0 | 0 | 0 | 0 | 40 |
| Crystalline Polyol |  |  |  |  |  |  |  |  |  |  |  |
| Rucoflex S105-30 | 40 | 25 | 20 | 20 | 25 | 25 | 25 | 20 | 25 | 25 | 25 |
| Dynacoll 7380 | 0 | 5 | 10 | 5 | 5 | 5 | 5 | 10 | 5 | 5 | 5 |
| Terathane 2000 | 0 | 10 | 0 | 0 | 0 | 0 | 10 | 0 | 0 | 0 | 0 |
| Terathane 1000 | 0 | 10 | 0 | 0 | 0 | 0 | 10 | 0 | 0 | 0 | 0 |
| Amorphous Polyol |  |  |  |  |  |  |  |  |  |  |  |
| Arcol PPG1025 | 10 | 0 | 0 | 0 | 0 | 0 | 0 | 0 | 0 | 0 | 0 |
| Arcol PPG2025 | 0 | 0 | 20 | 25 | 20 | 20 | 0 | 20 | 15 | 15 | 15 |
| Polyglycol B100–2000 | 0 | 0 | 0 | 0 | 0 | 0 | 0 | 0 | 5 | 15 | 15 |
| Crystalline Polyols (wt %) | 80 | 100 | 60 | 50 | 60 | 60 | 100 | 60 | 60 | 50 | 50 |
| Amorphous Polyols (wt %) | 20 | 0 | 40 | 50 | 40 | 40 | 0 | 40 | 40 | 50 | 50 |
| Amorphous Macromonomer (parts per 100 polyols) | 100 | 100 | 100 | 100 | 100 | 100 | 100 | 100 | 100 | 67 | 67 |
| Viscosity (cps) | 36900 | 9700 | 12650 | 8680 | 44800 | 14800 | 17800 | 7450 | 14780 | 5950 | 7825 |
| Initial Creep(mm) <Elapsed time before hanging weight> |  |  |  |  |  |  |  |  |  |  |  |
| 30 sec. | >25 | >25 | 0 | 0 | 1 | 3 | 2 | 0 | 0 | 0 | 0 |
| 1 min. | >25 | >25 | 0 | 0 | 0 | 0 | 0 | 0 | 0 | 0 | 0 |
| Open time (minutes) | >60 | 10 | >60 | 8 | 60 | 50 | 6 | 15 | 15 | 6.5 | 2.5 |
| Set time (seconds) | >60 | 80 | 30 | 20 | 30 | 30 | 45 | .40 | 30 | 50 | 60 |
| OLS strength MAPLE kg/cm² (psi) | 31.0 (443) | 52.3 (747) | 35.8 (512) | 66.6 (951) | 73.15 (1045) | 75.7 (1081) | 72.0 (1029) | 69.6 (994) | 97.3 (1390) | 90.4 (1291) | 76.9 (1098) |
| ABS | N/M (1) | 41.4 (592) | 40.25 (575) | 69.4 (992) | 69.8 (997) | 53.8 (768) | N/M | 70.35 (1005) | 43.05 (615) | 76.8 (1097) | 80.4 (1148) |
| Peel strength |  |  |  |  |  |  |  |  |  |  |  |
| kg/25 mm (piw) ABS | N/M | 3.33 (18.5) | 3.47 (19.3) | 6.57 (36.5) | 6.35 (35.3) | 5.74 (31.9) | 4.68 (26.0) | 6.88 (38.2) | 3.82 (21.2) | 6.30 (35.0) | 4.73 (26.3) |

(1) N/M = Not Measured

As indicated hereinabove, preferred adhesive compositions show less than 1 mm creep using a one minute lapse time before hanging the weight, a set time of less than 60 seconds, and an open time of greater than 5 minutes. The data demonstrate that Examples 42–49 met these preferred ranges. Examples 40 and 41 (both made from amorphous macromonomers having $T_g$ values of 0° C.) showed an initial creep greater than 25 mm using a one minute lapse time before hanging the weight. These examples also showed set times that were longer than the preferred set time of 60 seconds. While Example 50 (made from an amorphous macromonomer having a $T_g$ value of 70° C.) provided good initial creep resistance, it did not provide an open time within the preferred range. The data suggest that it is preferable to employ an amorphous macromonomer having a $T_g$ of at least 5° C. but less than 70° C. to achieve a moisture-curable hot melt adhesive that has the desired combination of open time, set time, and initial creep resistance. It is noted, however, that adhesives which do not meet all three preferred ranges for initial creep resistance, set time and open time may be suitable for some applications.

EXAMPLES 51–53

In these examples, the effect of adding a tackifier was demonstrated. Moisture-curable hot melt adhesives were prepared using amorphous macromonomer and tested as in Examples 27–39 with the following exceptions:

(1) A tackifier, Abitol, having an OH#=194, was added as a final component to Examples 52 and 53, and (2) The NCO/OH ratio for Examples 52 and 53 were 1.7 and 1.5, respectively.

In addition, each adhesive was tested for overlap shear (OLS) strength on ABS substrates and for Peel Strength. Results are reported in Table 8 below.

TABLE 8

|  | Ex. 51 | Ex. 52 | Ex. 53 |
|---|---|---|---|
| Amorphous Macromonomer Ex. 2 | 50 | 50 | 50 |
| Crystalline Polyol |  |  |  |
| Rucoflex S105-30 | 25 | 25 | 25 |
| Dynacoll 7380 | 5 | 5 | 5 |
| Terathane 2000 | 10 | 10 | 10 |
| Terathane 1000 | 10 | 10 | 10 |
| Tackifier Abitol | 0 | 5 | 5 |
| Crystalline Polyols (wt %) | 100 | 100 | 100 |
| Amorphous Polyols (wt %) | 0 | 0 | 0 |
| Amorphous Macromonomer (parts per 100 polyols) | 100 | 100 | 100 |
| NCO/OH Ratio | 2.0 | 1.7 | 1.5 |
| Viscosity (cps) | 44,800 | 9,800 | 9,770 |
| Initial Creep (mm) <Elapsed time before |  |  |  |

TABLE 8-continued

|  |  | Ex. 51 | Ex. 52 | Ex. 53 |
|---|---|---|---|---|
| hanging weight> |  |  |  |  |
| 30 sec. |  | 2 | 3 | 1.5 |
| 1 min. |  | 0 | 0 | 0 |
| Open time (minutes) |  | 6 | 5.75 | 6.5 |
| Set time (seconds) |  | 45 | 40 | 60 |
| OLS strength kg/cm$^2$ (psi) | Maple | 72.3 | 79.3 | 67.2 |
|  |  | (1029) | (1128) | (956) |
|  | ABS | N/M(1) | 44.1 | 44.4 |
|  |  |  | (627) | (632) |
| Peel strength kg/25 mm (piw) | ABS | 11.6 | 9.5 | 8.8 |
|  |  | (26.0) | (21.3) | (19.7) |

(1) N/M = Not Measured

From the data it can be seen that a tackifier can be used in the moisture-curable hot melt adhesives of the invention to reduce the viscosity of the adhesive even when the NCO/OH ratio is less than 2.0.

COMPARATIVE EXAMPLES C-1 and C-2

In these examples, comparative adhesives (C-1 and C-2) were prepared and tested as in Examples 27–39 except that an amorphous polymer having no hydroxy moieties was used in place of the macromonomer. Because the amorphous polymers had no hydroxyl groups, they did not become covalently bonded to the polyurethane backbone. Instead, these amorphous polymers were present as a physical blend in the adhesive composition.

The amorphous polymers (1 and 2) were prepared according to the General Preparation of Amorphous Macromonomer described above except that CBr$_4$ (a carbon tetrabromide chain transfer agent) was used in place of MPD. The quantities of each component used to make the amorphous polymers is provided in parts by weight in Table 9.

TABLE 9

|  | Amorphous Polymer 1 | Amorphous Polymer 2 |
|---|---|---|
| IOA | 40 | 40 |
| IBA | 60 | 60 |
| KB-1 | 0.14 | 0.14 |
| CBr$_4$ | 1 | 1.5 |

The amount of DMDEE used to make the comparative adhesives was 0.2% by weight, and the NCO/OH ratio was 2.0. In addition, each adhesive was tested for overlap shear (OLS) strength on ABS substrates and Peel Strength. For ease of comparison, the data of Example 44 is replicated here. Results are reported in Table 10 below.

TABLE 10

|  | Ex. 44 | C-1 | C-2 |
|---|---|---|---|
| Amorphous Macromonomer Ex. 7 ($T_g$ = 15, $M_n$ = 12000, OH# = 5.16) Polymer | 50 | 0 | 0 |
| Amorphous Polymer 1 ($T_g$ = 15, $M_n$ = 16,300, OH# = 0) | 0 | 50 | 0 |

TABLE 10-continued

|  | Ex. 44 | C-1 | C-2 |
|---|---|---|---|
| Amorphous Polymer 2 ($T_g$ = 15, $M_n$ = 12,800, OH# = 0) Crystalline Polyol | 0 | 0 | 50 |
| Rucoflex S105-30 | 25 | 25 | 25 |
| Dynacoll 7380 Amorphous Polyol | 5 | 5 | 5 |
| Arcol PPG2025 | 20 | 20 | 20 |
| Crystalline Polyols (wt %) | 60 | 60 | 60 |
| Amorphous Polyols (wt %) | 40 | 40 | 40 |
| Amorphous Macromonomer (parts per 100 polyols) | 100 | 0 | 0 |
| Viscosity (cps) | 44800 | 9800 | 9770 |
| Initial Creep (mm) <Elapsed time before hanging weight> |  |  |  |
| 30 sec. | 1 | 0 | 0.5 |
| 1 min. | 0 | 0 | 0 |
| Open time (minutes) | 60 | 2.5 | 3 |
| Set time (seconds) | 30 | 30 | 40 |
| OLS strength kg/cm$^2$ (psi) Maple | 73.5 | 57.3 | 61.2 |
|  | (1045) | (815) | (871) |
| ABS | 70.1 | 61.0 | 44.4 |
|  | (997) | (868) | (631) |
| Peel strength kg/25 mm (piw) ABS | 15.7 | 9.7 | 9.1 |
|  | (35.3) | (21.8) | (20.4) |

These data illustrate that the addition of an amorphous polymer having no hydroxy moieties to the adhesive composition does not provide open times within the preferred range of greater than 5 minutes and also provides lower OLS and peel strength values compared to the Example 44.

EXAMPLES 54–60

Moisture-curable hot melt adhesives were prepared using crystalline macromonomers according to the General Preparation of the Moisture-Curable Hot Melt Adhesive Using Crystalline Macromonomer(s). The NCO/OH ratio of each example was 2.0. Each example also included 0.2 weight % of Thancat DMDEE. The type and quantity (in parts by weight) of other components used to make each adhesive is provided in Table 11. Each adhesive was tested for viscosity, initial creep resistance, open time, set time, overlap shear (OLS) strength on maple and ABS substrates, and peel strength according to the test methods outlined above. Test results are summarized in Table 11.

TABLE 11

|  | Ex. 54 | Ex. 55 | Ex. 56 | Ex. 57 | Ex. 58 | Ex. 59 | Ex. 60 |
|---|---|---|---|---|---|---|---|
| Crystalline Macromonomer |  |  |  |  |  |  |  |
| Ex. 23 (OH# = 5.16) | 4.8 | 25 | 50 | 35 | 70 | 50 | 70 |
| Ex. 15 (OH# = 2.07) | 0 | 0 | 0 | 35 | 0 | 0 | 25.3 |
| Crystalline Polyol |  |  |  |  |  |  |  |
| Rucoflex S105-30 | 15.2 | 0 | 0 | 0 | 0 | 0 | 0 |
| Dynacoll 7380 | 40 | 35 | 30 | 0 | 20 | 25 | 4.7 |
| Amorphous Polyol |  |  |  |  |  |  |  |
| HPVM 2201 | 35 | 37 | 15 | 30 | 5 | 15 | 0 |
| Polyglycol B100–2000 | 5 | 3 | 5 | 0 | 5 | 10 | 0 |
| Crystalline Polyols (wt %) | 58 | 47 | 60 | 0 | 67 | 50 | 100 |
| Amorphous Polyols (wt %) | 42 | 53 | 40 | 100 | 33 | 50 | 0 |
| Crystalline Macromonomer (parts per 100 polyols) | 5.0 | 33.3 | 100 | 233.3 | 233 | 100 | 2028 |
| Viscosity (cps) | 34800* | 24650 | 31850* | 30400* | 15670 | 8400 | 84000** |
| Initial Creep (mm) |  |  |  |  |  |  |  |
| <Elapsed time before hanging weight> |  |  |  |  |  |  |  |
| 30 sec. | 0 | 0 | 0 | 3 | 0 | 0 | 0 |
| 1 min. | 0 | 0 | 0 | 1 | 0 | 0 | 0 |
| Open time (minutes) | 25 | 60 | 7 | 10 | 60 | 40 | 5.5 |
| Set time (seconds) | 60 | 30 | 20 | 60 | 20 | 30 | 30 |
| OLS strength kg/cm$^2$ (psi) Maple | 64.8 | 72.0 | 59.0 | 40.2 | 56.7 | 68.0 | 52.6 |
|  | (922) | (1024) | (839) | (572) | (807) | (967) | (748) |
| ABS | 60.7 | 47.6 | 36.2 | 40.7 | 36.2 | 52.9 | 18.7 |
|  | (863) | (677) | (515) | (579) | (515) | (752) | (266) |
| Peel strength kg/25 mm (piw) | 16.8 | 17.4 | 13.3 | 7.1 | 9.9 | 16.9 | 3.2 |
|  | (37.6) | (39.1) | (7.3) | (15.9) | (22.2) | (38.0) | (7.1) |

*5 rpm, **2.5 rpm

The data demonstrate that when a crystalline macromonomer is utilized as a component in the moisture-curable hot-melt adhesive of the invention, crystalline and/or amorphous polyols can be utilized.

EXAMPLES 61–67

In these examples, adhesives were prepared using crystalline macromonomers having different theoretical hydroxy numbers according to the General Preparation of the Moisture-Curable Hot Melt Adhesive Using Crystalline Macromonomer(s). The NCO/OH ratio of each example was 2.0. Each example also included 0.2 weight % of Thancat DMDEE. The type and quantity (in parts by weight) of other components used to make each adhesive are reported in Table 12 below. Each adhesive was tested for viscosity, initial creep resistance, open time, set time, overlap shear (OLS) strength on maple and ABS substrates, and peel strength according to the test methods outlined above. Test results are summarized in Table 12.

TABLE 12

|  | Ex. 61 | Ex. 62 | Ex. 63 | Ex. 64 | Ex. 65 | Ex. 66 | Ex. 67 |
|---|---|---|---|---|---|---|---|
| Crystalline Macromonomer |  |  |  |  |  |  |  |
| Ex. 26 (OH # = 0.31, $T_m$ = 30.6° C.) | 10 | 0 | 0 | 0 | 0 | 0 | 0 |
| Ex. 25 (OH # = 1.04, $T_m$ = 30.5° C.) | 0 | 35 | 0 | 0 | 0 | 0 | 0 |
| Ex. 24 (OH # = 2.07, $T_m$ = 30.0° C.) | 0 | 0 | 45 | 0 | 0 | 0 | 0 |
| Ex. 23 (OH # = 5.16, $T_m$ = 30.8° C.) | 0 | 0 | 0 | 50 | 0 | 0 | 0 |
| Ex. 22 (OH # = 10.28, $T_m$ = 30.2° C.) | 0 | 0 | 0 | 0 | 55 | 0 | 0 |
| Ex. 21 (OH # = 18.35, $T_m$ = 32.5° C.) | 0 | 0 | 0 | 0 | 0 | 25 | 0 |
| Ex. 20 (OH # = 25.3, $T_m$ = 33.4° C.) | 0 | 0 | 0 | 0 | 0 | 0 | 25 |
| Crystalline Polyol |  |  |  |  |  |  |  |
| Dynacoll 7380 | 30 | 25 | 25 | 25 | 25 | 35 | 35 |
| Amorphous Polyol |  |  |  |  |  |  |  |
| HPVM 2201 | 20 | 15 | 15 | 15 | 15 | 37 | 37 |
| Polyglycol B100–2000 | 40 | 25 | 15 | 10 | 5 | 3 | 3 |
| Crystalline Polyols (wt %) | 33 | 38 | 45 | 50 | 56 | 47 | 47 |
| Amorphous Polyols (wt %) | 67 | 62 | 55 | 50 | 44 | 53 | 53 |
| Crystalline Macromonomer (parts per 100 polyols) | 11.1 | 53.8 | 81.8 | 100 | 122.2 | 33.3 | 33.3 |
| Viscosity (cps) | 4600 | 18000 | 17400 | 8400 | 7500 | 16350 | 20620 |
| Initial Creep (mm) |  |  |  |  |  |  |  |
| <Elapsed time before hanging weight> |  |  |  |  |  |  |  |
| 30 sec. | 0 | 0 | 0 | 0 | 0 | 0 | 0 |
| 1 min. | 0 | 0 | 0 | 0 | 0 | 0 | 0 |

TABLE 12-continued

|  | Ex. 61 | Ex. 62 | Ex. 63 | Ex. 64 | Ex. 65 | Ex. 66 | Ex. 67 |
|---|---|---|---|---|---|---|---|
| Open time (minutes) | 30 | >60 | 40 | 40 | 20 | 50 | 30 |
| Set time (seconds) | 30 | 30 | 20 | 30 | 20 | 60 | 60 |
| OLS strength kg/cm$^2$ (psi) | | | | | | | |
| Maple | 60.5 | 70.6 | 61.2 | 68.0 | 73.5 | 72.1 | 69.0 |
|  | (860) | (1004) | (868) | (967) | (1046) | (1025) | (981) |
| ABS | 72.4 | 52.4 | 48.3 | 52.9 | 48.5 | 55.5 | 44.1 |
|  | (1030) | (745) | (687) | (752) | (690) | (789) | (627) |
| Peel strength kg/25 mm (piw) | 16.0 | 14.5 | 20.9 | 16.9 | 16.4 | 17.6 | 15.6 |
|  | (35.9) | (32.4) | (46.9) | (38.0) | (36.7) | (39.5) | (35.0) |

The data demonstrate that crystalline macromonomers having a variety of theoretical OH#s and $T_m$ values are useful in the moisture-curable hot-melt adhesive of the invention.

COMPARATIVE EXAMPLES C-3 and C-4

In these examples, conventional moisture-curable, hot-melt adhesives having crystalline polyol and amorphous polyol components were prepared according to the General Preparation of Moisture-Curable Hot Melt Adhesive Using Amorphous Macromonomer described above. In these examples, the isocyanate was MDI, and the isocyanate index was 2.0. Each adhesive was made using 0.2% by weight of DMDEE. The type and quantity (in parts by weight) of the other components used are reported in Table 13. Each adhesive was tested for viscosity, initial creep resistance, open time, set time, and overlap shear (OLS) strength on maple substrates. Results are reported in Table 13 below.

TABLE 13

|  | C-3 | C-4 |
|---|---|---|
| Crystalline Polyol | | |
| Rucoflex S105-30 | 50 | 90 |
| Amorphous Polyol | | |
| Arcol PPG2025 | 50 | 10 |
| Viscosity (cps) | 725 | 4650 |
| Initial Creep (mm) | | |
| <Elapsed time before hanging weight> | | |
| 30 sec. | >25 | >25 |
| 1 min. | >25 | 0.5 |
| Open time (minutes) | 3.5 | 1.5 |
| Set time (seconds) | 120 | 60 |
| OLS strength kg/cm$^2$ (psi) | 49.3 | 109.3 |
| Maple | (701) | (1555) |

The data demonstrate that conventional moisture-curable, hot melt adhesives failed to provide the preferred balance of initial creep resistance, open time and set time.

Example Showing Property Comparison

Comparative Example C-3 (a conventional moisture-curable, hot melt adhesive), Example 33 (a moisture-curable, hot melt adhesive comprising amorphous macromonomer) and Example 64 (a moisture-curable, hot melt adhesive comprising crystalline macromonomer) were tested for viscosity, open time, and set time using the test procedures described above. In addition, these adhesives were tested for impact resistance, rolling ball tack, and peel strength using the following procedures:

Impact Resistance

Impact resistance was measured by preparing a test sample using the same procedure given for the Overlap Shear Test, except that a 6.45 cm$^2$ (1 in$^2$) overlap bond area was made using polyvinylchloride (PVC) substrates. Each end of the test sample was affixed in the Pendulum Impact Tester (described in ASTM D-950) so that the longest edge of the overlapping substrates was perpendicular to the 1.36 kg (3 lb) hammer of the tester and the hammer of the tester impacted the center portion of the interface of the overlapping region. The hammer was allowed to strike test samples 3, 5 and 10 minutes after bond formation. The kg$_f$-cm (lb$_f$-in) reading provided by the tester during impact was recorded as impact resistance. Values were reported as the average of at least two trials.

Rolling Ball Tack

Rolling ball tack was measured by adhering a piece of paper to a flat surface using spray adhesive. The paper was essentially free from any wrinkles, creases or splices. Two strips of 3M 232 Masking Tape were than applied to the piece of paper, 2.5 cm (1 in) apart. The hot melt composition was extruded between the two strips at about 121° C. (250° F.) and immediately spread using a teflon-tape coated edge of a steel panel to form an adhesive film having dimensions: 25.4 cm (10 in) long×2.5 cm (1 in) wide×0.16 cm thick. A Rolling Ball Test Apparatus (described in PSTC-6) was positioned so that its raceway directly lead to the center of the adhesive film. The raceway was cleaned with methyl ethyl ketone (MEK). A steel ball having a diameter of 1.1 cm (0.44 in) was cleaned with MEK and wiped with a paper towel. Using clean, dry tongs, the ball was placed in the raceway and allowed to roll to a stop on the adhesive one minute after the adhesive was applied to the paper. The distance from the point the ball initially contacted the adhesive film to the point where it stopped was measured. A shorter distance means higher tackiness. Values were reported as the average of three trials.

Peel Strength

Peel strength was measured using the test procedure described previously, except that a PVC substrate was used in place of the ABS substrate and the test was conducted at various time intervals following bond formation. This provided an indication of the strength build-up of the adhesive.

Results of the above tests are provided below in Table 14.

TABLE 14

|  | C-3 | Ex. 33 | Ex. 64 |
|---|---|---|---|
| Viscosity (cps) | 725 | 14800 | 8400 |
| Initial Creep (mm) | | | |
| <Elapsed time before hanging weight> | | | |
| 30 sec | >25 | 3 | 0 |
| 1 min | >25 | 0 | 0 |
| Open time (min) | 3.5 | 50 | 40 |
| Set Time (sec) | 120 | 30 | 30 |
| Impact Resistance kg$_f$-cm (lb$_f$-in) | | | |
| <Time after bonding> | | | |
| 3 min | 20.7 (18.0) | 23.0 (20.0) | 69.1 (60.0)* |
| 5 min | 25.9 (22.5) | 32.8 (28.5) | 69.1 (60.0)* |
| 10 min | 31.7 (27.5) | 40.9 (35.5) | 69.1 (60.0)* |
| Rolling Ball Tack cm (in) | 5.6 (2.2) | >25.4 (>10) | 6.6 (2.6) |
| Peel Strength Build-up kg/25 mm (piw) | | | |
| 1 min | 0.04 (0.1) | 0.27 (0.6) | 1.61 (3.6) |
| 2 min | 0.09 (0.2) | 0.40 (0.9) | 1.83 (4.1) |
| 3 min | 0.18 (0.4) | 0.94 (2.1) | 2.19 (4.9) |
| 5 min | 0.22 (0.5) | 1.03 (2.3) | 2.72 (6.1) |
| 10 min | 0.22 (0.5) | 1.43 (3.2) | 2.81 (6.3) |
| 15 min | 0.22 (0.5) | 1.52 (3.4) | 3.12 (7.0) |
| 30 min | 0.22 (0.5) | 1.92 (4.3) | 3.35 (7.5) |

*Test sample did not break

The data show that crystalline macromonomers are preferred over amorphous macromonomers for preparing moisture-curable, hot melt adhesives which have good impact resistance, tack, and peel strength build-up in addition to initial creep resistance, long open times and short set times. The data also show adhesives of the invention comprising either crystalline or amorphous macromonomers provide improved physical properties over conventional adhesives.

We claim:

1. A moisture-curable, hot melt composition comprising a graft polyurethane prepolymer having a polyurethane backbone that (1) is terminated by at least one moisture-reactive group and (2) has at least one crystalline macromonomer sidechain grafted thereto, said crystalline macromonomer sidechain derived from a crystalline macromonomer bearing a terminal moiety having two hydroxyl groups and comprising polymerized units of one or more monomers that are free from active hydrogen-containing moieties.

2. A moisture-curable, hot melt composition according to claim 1, wherein said at least one moisture-reactive group is selected from the group consisting of an isocyanate group and a silane group.

3. A moisture-curable, hot melt composition according to claim 1, wherein said graft polyurethane prepolymer comprises the reaction product of at least one polyol, at least one diisocyanate, and at least one crystalline macromonomer, wherein said polyol is crystalline.

4. A moisture-curable, hot melt composition according to claim 1 wherein said polymerized units of said crystalline macromonomer consist essentially of (meth)acrylate monomers.

5. A moisture-curable, hot melt composition according to claim 1 wherein said crystalline macromonomer exhibits a $T_m$ in the range of from about 15° C. to about 135° C.

6. A moisture-curable, hot melt composition according to claim 1, wherein said crystalline macromonomer comprises polymerized units of at least one crystalline monomer, at least one low $T_g$ monomer, and at least one high $T_g$ monomer.

7. A moisture-curable, hot melt composition according to claim 6, wherein said crystalline monomer is selected from the group consisting of monofunctional (meth)acrylate esters of non-tertiary alcohols, the alkyl portions of which comprise from about 16 to about 50 carbon atoms, and blends thereof.

8. A moisture-curable, hot melt composition according to claim 6, wherein said low $T_g$ monomer is selected from the group consisting of monofunctional (meth)acrylate esters of non-tertiary alkyl alcohols (the alkyl portions of which comprise 1 to about 15 carbon atoms) which provide a homopolymer having a $T_g$ less than 5° C., and blends thereof.

9. A moisture-curable, hot melt composition according to claim 6, wherein said high $T_g$ monomer is selected from the group consisting of monofunctional (meth)acrylate esters of non-tertiary alcohols (the alkyl or cycloalkyl portions of which comprise from about 1 to about 15 carbon atoms) which provide a homopolymer having a $T_g$ equal to or greater than 5° C., acrylamides, and blends thereof.

10. A moisture-curable, hot melt composition according to claim 6, wherein said crystalline monomer is selected from the group consisting of octadecyl (meth)acrylate and behenyl (meth)acrylate.

11. A moisture-curable, hot melt composition according to claim 6, wherein said low $T_g$ monomer is selected from the group consisting of butyl acrylate, isooctyl acrylate, 2-ethylhexyl acrylate and lauryl acrylate.

12. A moisture-curable, hot melt composition according to claim 6, wherein said high $T_g$ monomer is selected from the group consisting of isobornyl acrylate, N,N-dimethyl acrylamide, and methyl (meth)acrylate.

13. A moisture-curable, hot melt composition according to claim 1, wherein said macromonomer is amorphous.

14. A moisture-curable, hot melt composition according to claim 1 wherein said macromonomer has a theoretical $T_g$ in the range of from about 5° C. to about 80° C.

15. A moisture-curable, hot melt composition according to claim 1, wherein said macromonomer comprises polymerized units of at least one low $T_g$ monomer and at least one high $T_g$ monomer.

16. A moisture-curable, hot melt composition according to claim 15, wherein said low $T_g$ monomer is selected from the group consisting of monofunctional (meth)acrylate esters of non-tertiary alkyl alcohols (the alkyl portions of which comprise 1 to about 15 carbon atoms) which provide a homopolymer having a $T_g$ less than 5° C., and blends thereof.

17. A moisture-curable, hot melt composition according to claim 15 wherein said high $T_g$ monomer is selected from the group consisting of monofuncional (meth)acrylate esters of non-teriary alcohols (the alkyl or cycloalkyl portions of which comprise from about 1 to about 15 carbon atoms) which provide a homopolymer having a $T_g$ equal to or greater than 5° C., acrylamides, and blends thereof.

18. A moisture-curable, hot melt composition according to claim 15, wherein said low $T_g$ monomer is selected from the group consisting of butyl acrylate, isooctyl acrylate, 2-ethylhexyl acrylate and lauryl acrylate.

19. A moisture-curable, hot melt composition according to claim 15, wherein said high $T_g$ monomer is selected from the group consisting of isobornyl acrylate, N,N-dimethyl acrylamide, and methyl (meth)acrylate.

20. A moisture-curable, hot melt composition according to claim 1, wherein said composition provides an initial creep resistance less than 1 mm one minute after bond formation.

21. A moisture-curable, hot melt composition according to claim 1, wherein said composition provides a set time less than 60 seconds.

22. A moisture-curable, hot melt composition according to claim 1, wherein said composition provides an open time greater than 5 minutes.

23. A crystalline macromonomer bearing a terminal moiety having two hydroxyl groups and comprising polymerized units of at least one crystalline monomer, at least one high $T_g$ monomer, and optionally at least one low $T_g$ monomer, each monomer being free from active hydrogen-containing moieties.

24. A crystalline macromonomer according to claim 23 wherein said crystalline monomer is selected from the group consisting of monofunctional (meth)acrylate esters of non-tertiary alcohols, the alkyl portions of which comprise from about 16 to about 50 carbon atoms, and blends thereof, said optional low $T_g$ monomer is selected from the group consisting of monofunctional (meth)acrylate esters of non-tertiary alkyl alcohols (the alkyl portions of which comprise 1 to about 15 carbon atoms) which provide a homopolymer having a $T_g$ less than 5° C., and blends thereof, and said high $T_g$ monomer is selected from the group consisting of monofunctional (meth)acrylate esters of non-tertiary alcohols (the alkyl or cycloalkyl portions of which comprise from about 1 to about 15 carbon atoms) which provide a homopolymer having a $T_g$ equal to or greater than 5° C., acrylamides, and blends thereof.

25. A crystalline macromonomer according to claim 23 wherein said crystalline monomer is selected from the group consisting of octadecyl (meth)acrylate and behenyl (meth)acrylate; said optional low $T_g$ monomer is selected from the group consisting of butyl acrylate, isooctyl acrylate, 2-ethylhexyl acrylate, and lauryl acrylate; and said high $T_g$ monomer is selected from the group consisting of isobornyl acrylate, N,N-dimethyl acrylamide, and methyl (meth)acrylate.

26. Two substrates bonded together using the composition of claim 1.

27. The cured composition of claim 1.

28. A moisture-curable, hot melt composition comprising a graft polyurethane prepolymer having a polyurethane backbone that (1) is terminated by at least one moisture-reactive group and (2) has at least one macromonomer sidechain grafted thereto, said macromonomer sidechain derived from a macromonomer bearing a terminal moiety having two hydroxyl groups and comprising polymerized units of one or more monomers that are free from active hydrogen-containing moieties, wherein said moisture-curable, hot melt composition provides an open time greater than 5 minutes.

29. A moisture-curable, hot melt composition according to claim 1, wherein said polyurethane backbone comprises crystalline segments derived from a crystalline polyol.

* * * * *

UNITED STATES PATENT AND TRADEMARK OFFICE
CERTIFICATE OF CORRECTION

PATENT NO. : 5,908,700
DATED : June 1, 1999
INVENTOR(S) : Yoshinori Shimizu, Gaddam N. Badu, and Albert I. Everaerts It is certified that error appears in the above-identified patent and that said Letters Patent is hereby corrected as shown below:

Column 7,
Line 30, "β-methacryloxy" should read -- γ-methacryloxy --.

Column 8,
Line 64, "β-methacryloxy" should read -- γ-methacryloxy --.

Column 15,
Line 20, "OH# = 5611 X $W_a/(W_b \times W_c)$" should read -- OH# = 56110 X $W_a/(W_b \times W_c)$ --.
Line 30, "macro monomer" should read -- macaromonomer --.

Column 16,
Table 1, "Conversion" should read -- % Conversion --.

Columns 23 and 24,
Line labeled Polyglycol B100-2000, under Ex. 31, "s" should read -- 5 --.

Columns 25 and 26,
Line labeled Set time (seconds), under Ex. 47, ".40" should read -- 40 --.

Column 34,
Lines 60, 62 and 65, "1" should read -- 28 --.

Signed and Sealed this

Eleventh Day of December, 2001

*Attest:*

NICHOLAS P. GODICI
*Attesting Officer*   *Acting Director of the United States Patent and Trademark Office*